(12) United States Patent
Piche

(10) Patent No.: US 11,305,627 B2
(45) Date of Patent: Apr. 19, 2022

(54) VERTICALLY ACTUATING AUTOMATED TONNEAU COVER FOR TRUCKS

(71) Applicant: Mario Piche, Calgary (CA)

(72) Inventor: Mario Piche, Calgary (CA)

( * ) Notice: Subject to any disclaimer, the term of this patent is extended or adjusted under 35 U.S.C. 154(b) by 0 days.

(21) Appl. No.: 17/122,137

(22) Filed: Dec. 15, 2020

(65) Prior Publication Data
US 2021/0229537 A1 Jul. 29, 2021

Related U.S. Application Data

(60) Provisional application No. 62/964,782, filed on Jan. 23, 2020.

(51) Int. Cl.
*B60J 7/16* (2006.01)
*B60P 7/02* (2006.01)

(52) U.S. Cl.
CPC .............. *B60J 7/1614* (2013.01); *B60P 7/02* (2013.01)

(58) Field of Classification Search
CPC . B60J 7/1614; B60J 7/106; B60J 7/198; B60J 7/047; B60J 7/057; B60P 3/34; B60P 7/02
USPC ... 296/100.02, 100.1, 100.05, 100.17, 26.04, 296/26.06
See application file for complete search history.

(56) References Cited

U.S. PATENT DOCUMENTS

| | | |
|---|---|---|
| 3,649,073 A | 3/1972 | Whittemore |
| 4,083,596 A | 4/1978 | Robertson |
| 5,016,858 A * | 5/1991 | Mitchell ............... B66F 7/0625 254/122 |
| 5,364,154 A | 11/1994 | Kaiser |
| 5,366,266 A | 11/1994 | Harbison |
| 5,375,900 A | 12/1994 | Tessenyi et al. |
| 5,385,377 A | 1/1995 | Girard |
| 5,595,418 A | 1/1997 | Medlin |
| 5,632,522 A | 5/1997 | Gaitan et al. |
| 5,971,446 A | 10/1999 | Lunney, II |
| 5,988,728 A | 11/1999 | Lund et al. |
| 6,082,806 A | 7/2000 | Bogard |
| 6,109,681 A | 8/2000 | Edwards et al. |
| 6,209,944 B1 * | 4/2001 | Billiu ..................... B60J 7/1614 296/100.02 |
| 6,217,102 B1 | 4/2001 | Lathers |
| 6,227,592 B1 | 5/2001 | Thacker |
| 6,447,045 B1 | 9/2002 | Dickson et al. |

(Continued)

*Primary Examiner* — Joseph D. Pape
*Assistant Examiner* — Veronica Marie Shull
(74) *Attorney, Agent, or Firm* — ATMAC Patent Services Ltd.; Andrew T. MacMillan

(57) ABSTRACT

A tonneau cover system for a vehicle includes a cover, a scissor lift assembly, and an electric actuator. The scissor lift has a fixed arm for mounting to an inner side panel of a cargo bed of the vehicle and a plurality of movable arms coupled to the fixed arm for selectively raising and lowering the cover in dependence upon a distance between a drive point on one of the movable arms and the fixed arm. The electric actuator has an end anchored at a fixed position relative to the fixed arm and a second end coupled to the drive point. The actuator dynamically changes length under electrical power to be between an extended length and a retracted length thereby changing the distance between the drive point and the fixed arm. A controller control the electric actuator to change length in accordance with a user input signal.

20 Claims, 17 Drawing Sheets

(56) References Cited

U.S. PATENT DOCUMENTS

| | | | |
|---|---|---|---|
| 6,520,558 B1 | 2/2003 | Katterloher et al. | |
| 6,666,490 B1 | 12/2003 | Thacker | |
| 6,929,303 B1 | 8/2005 | Sharples | |
| 7,422,265 B1 * | 9/2008 | Liao | B60P 7/02 |
| | | | 296/100.08 |
| 7,942,464 B2 | 5/2011 | Schmidt | |
| 9,981,600 B2 * | 5/2018 | Dylewski, II | B60J 7/1607 |
| 2003/0141740 A1 | 7/2003 | Comstock | |
| 2005/0029832 A1 | 2/2005 | Verduci et al. | |
| 2008/0191512 A1 | 8/2008 | Kealy | |
| 2008/0315633 A1 * | 12/2008 | Antreich | B60J 7/1269 |
| | | | 296/223 |
| 2011/0309651 A1 | 12/2011 | Hernandez et al. | |
| 2014/0265404 A1 * | 9/2014 | Mulholland | A61G 3/0875 |
| | | | 296/19 |
| 2015/0197290 A1 * | 7/2015 | Chapman | B60J 7/1607 |
| | | | 296/100.08 |
| 2018/0186221 A1 | 7/2018 | Capiak et al. | |
| 2019/0061497 A1 * | 2/2019 | Trinier | B60J 7/198 |

* cited by examiner

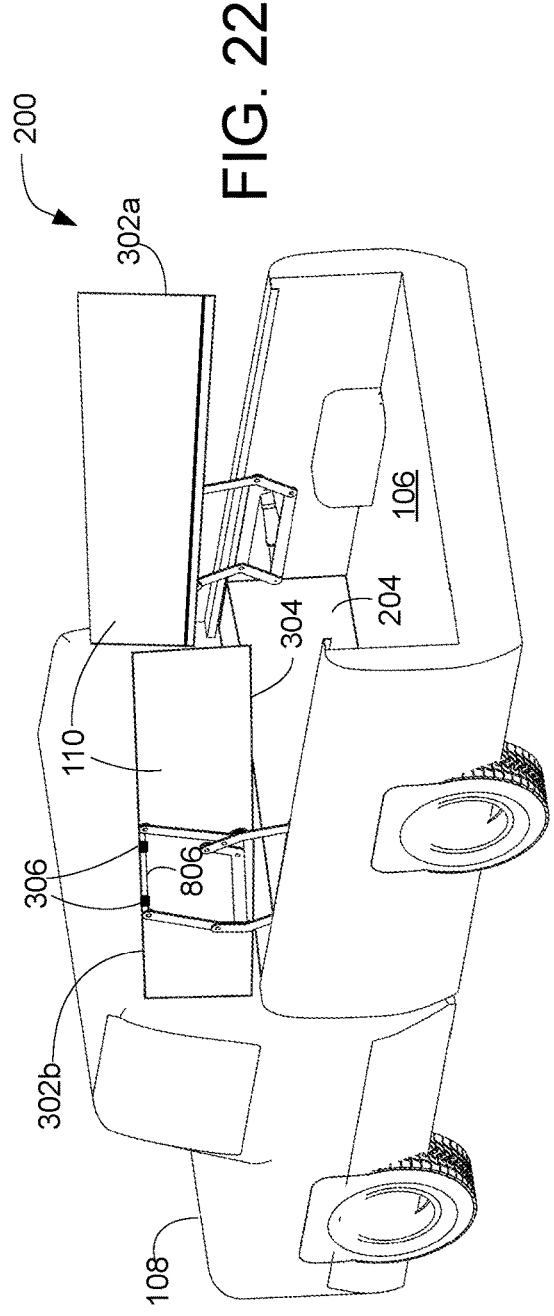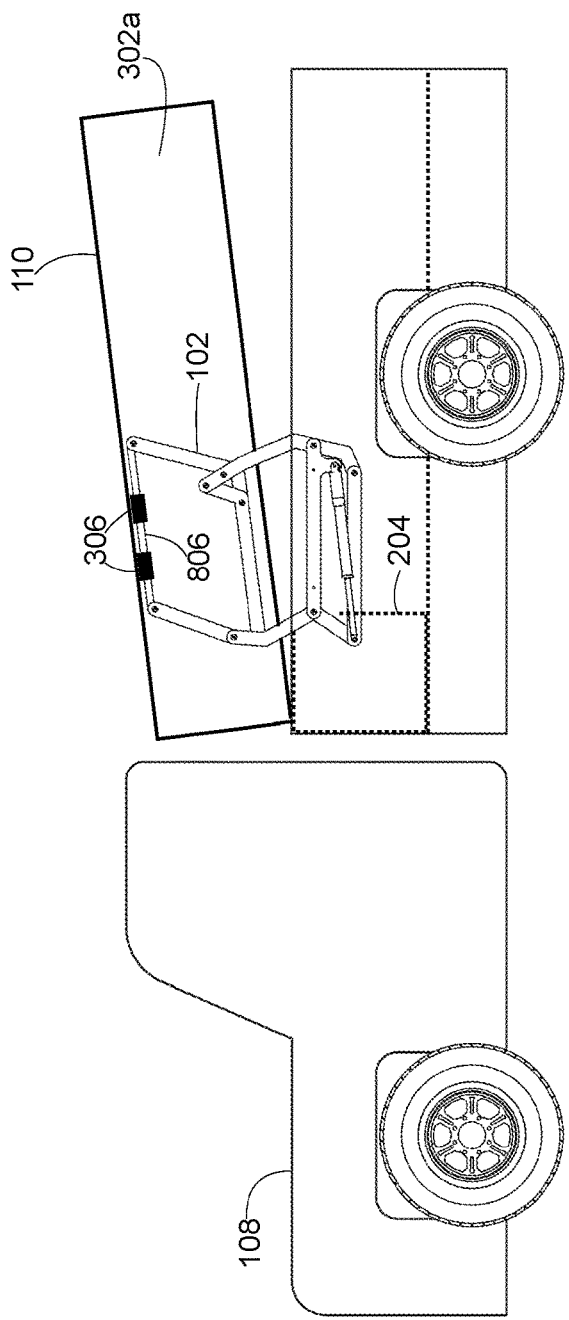

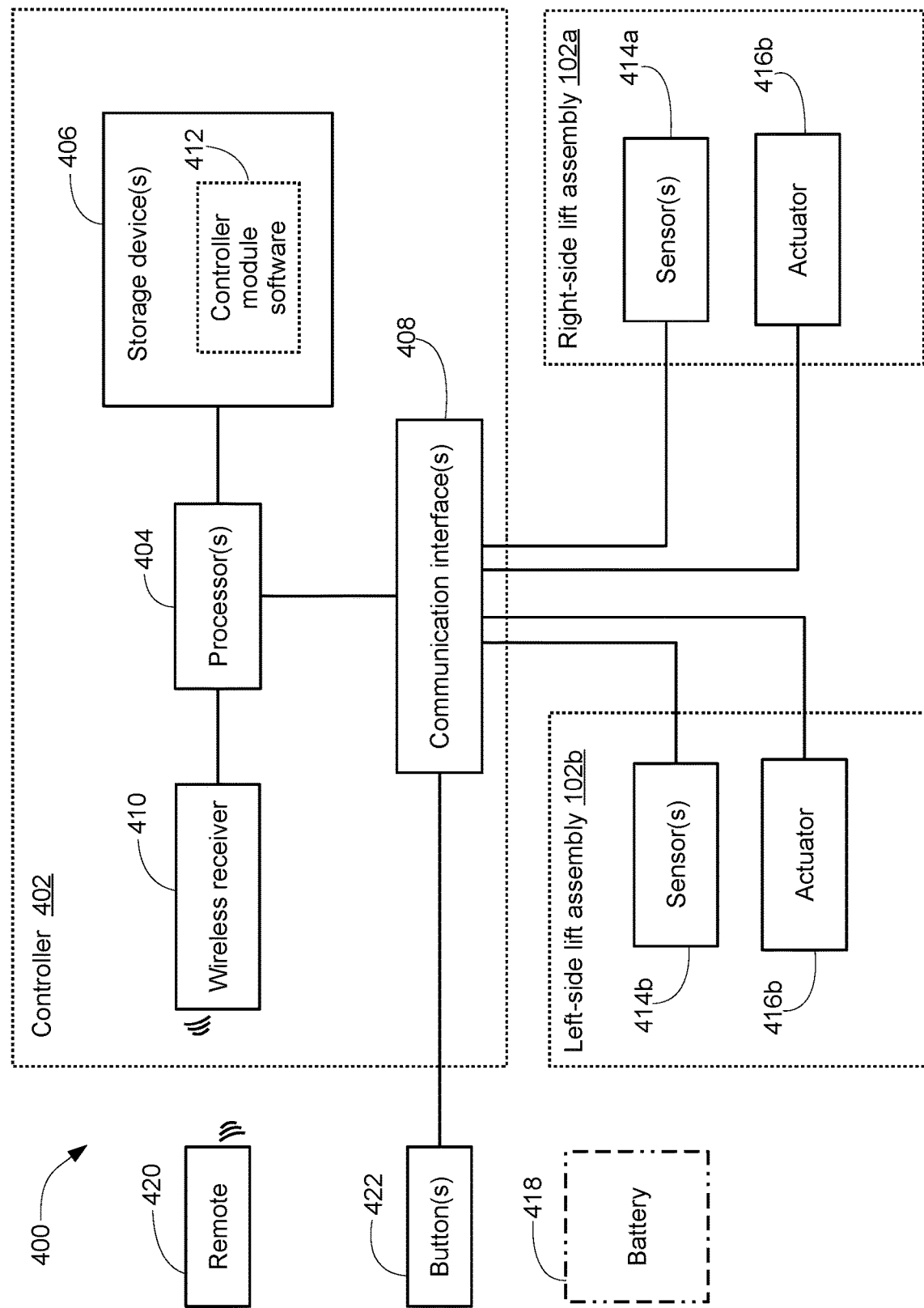

VERTICALLY ACTUATING AUTOMATED TONNEAU COVER FOR TRUCKS

CROSS-REFERENCE TO RELATED APPLICATIONS

This application claims the benefit of priority of U.S. Provisional Application No. 62/964,782 filed Jan. 23, 2020, which is incorporated herein by reference.

BACKGROUND OF THE INVENTION

(1) Field of the Invention

The invention pertains generally to tonneau covers for pickup trucks and other vehicles. More specifically, the invention relates to a vertically actuating automated tonneau cover.

(2) Description of the Related Art

A tonneau cover is a device to cover up and protect items stored in a cargo bed of a vehicle such as a pickup truck. Most tonneau covers on the market are manual covers that require physical strength by users to open and close. Besides being inconvenient, manual covers typically involve a folding action which means snow and ice needs to be removed prior to opening.

Automated tonneau covers are known; however, most automated tonneau covers involve a rolling or sliding action in order to open. These types of automated mechanisms perform poorly in adverse conditions where dust, dirt, mud, snow, and ice often prevent smooth operation.

BRIEF SUMMARY OF THE INVENTION

According to an exemplary embodiment of the invention there is disclosed a tonneau cover system for a vehicle. The tonneau cover system includes a cover and a first scissor lift assembly having a first fixed arm for mounting to a first inner side panel of a cargo bed of the vehicle and having a plurality of first movable arms coupled to the first fixed arm for selectively raising and lowering the cover in dependence upon a distance between a first drive point on one of the first movable arms and the first fixed arm. The system further includes a first electric actuator coupled to the first scissor lift. The first electric actuator has a first end anchored at a fixed position relative to the first fixed arm and a second end coupled to the first drive point. The first electric actuator is for dynamically changing length under electrical power to be between an extended length and a retracted length thereby changing the distance between the first drive point and the first fixed arm. The system further includes a controller coupled to the first electric actuator and configured to control the first electric actuator to change length in accordance with a user input signal.

According to an exemplary embodiment of the invention there is disclosed a solid cover that is lifted vertically at a slight angle via a linkage system that lifts the cover vertically at the same time as positioning the cover at a slight angle while it is being lifted.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 22 shows a perspective view of a tonneau cover system in the raised position with a cover having detachable side sections shown in the detached position according to an exemplary embodiment.

FIG. 23 shows a side view of the tonneau cover system of FIG. 22 having the detachable side sections of the cover shown in the detached position.

FIG. 24 shows a block diagram of an electronics control system for controlling an automated tonneau cover according to an exemplary embodiment.

DETAILED DESCRIPTION

Figure 1:
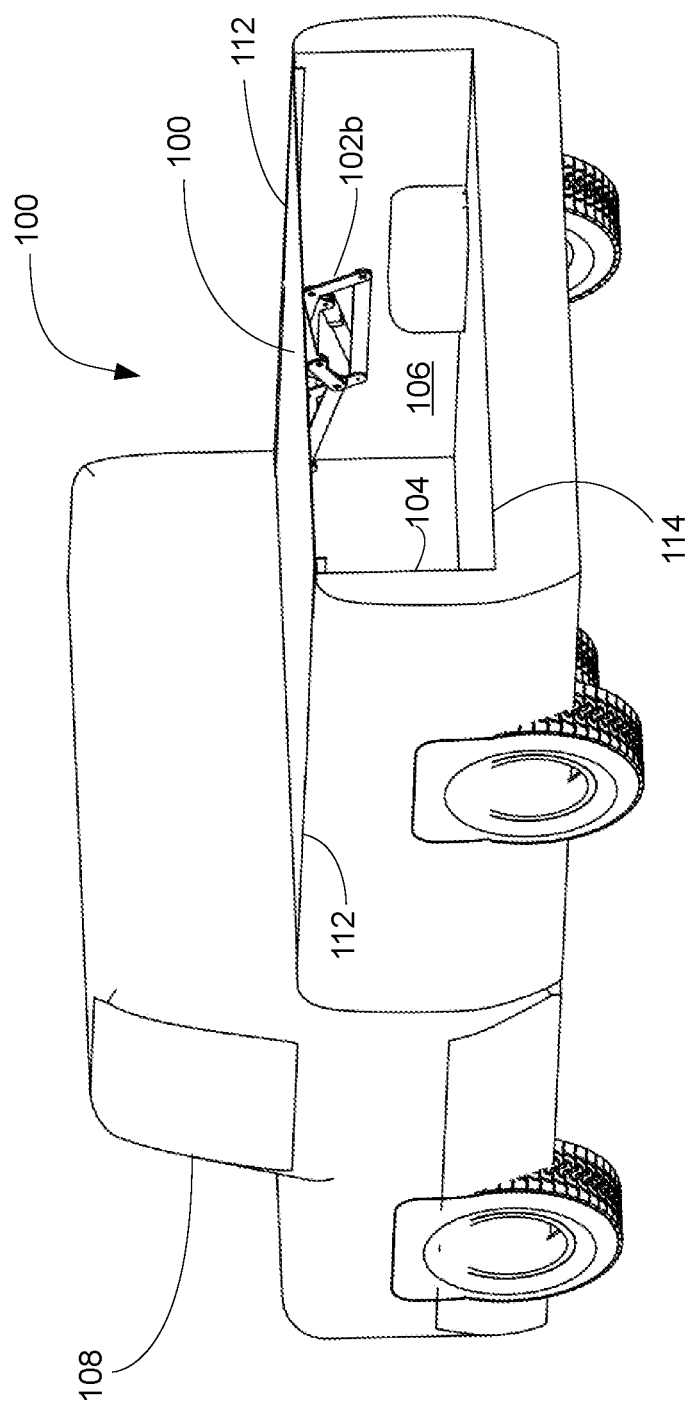
FIG. 1 shows a perspective view of a tonneau cover system in a fully closed position according to an exemplary embodiment.
Figure 2:
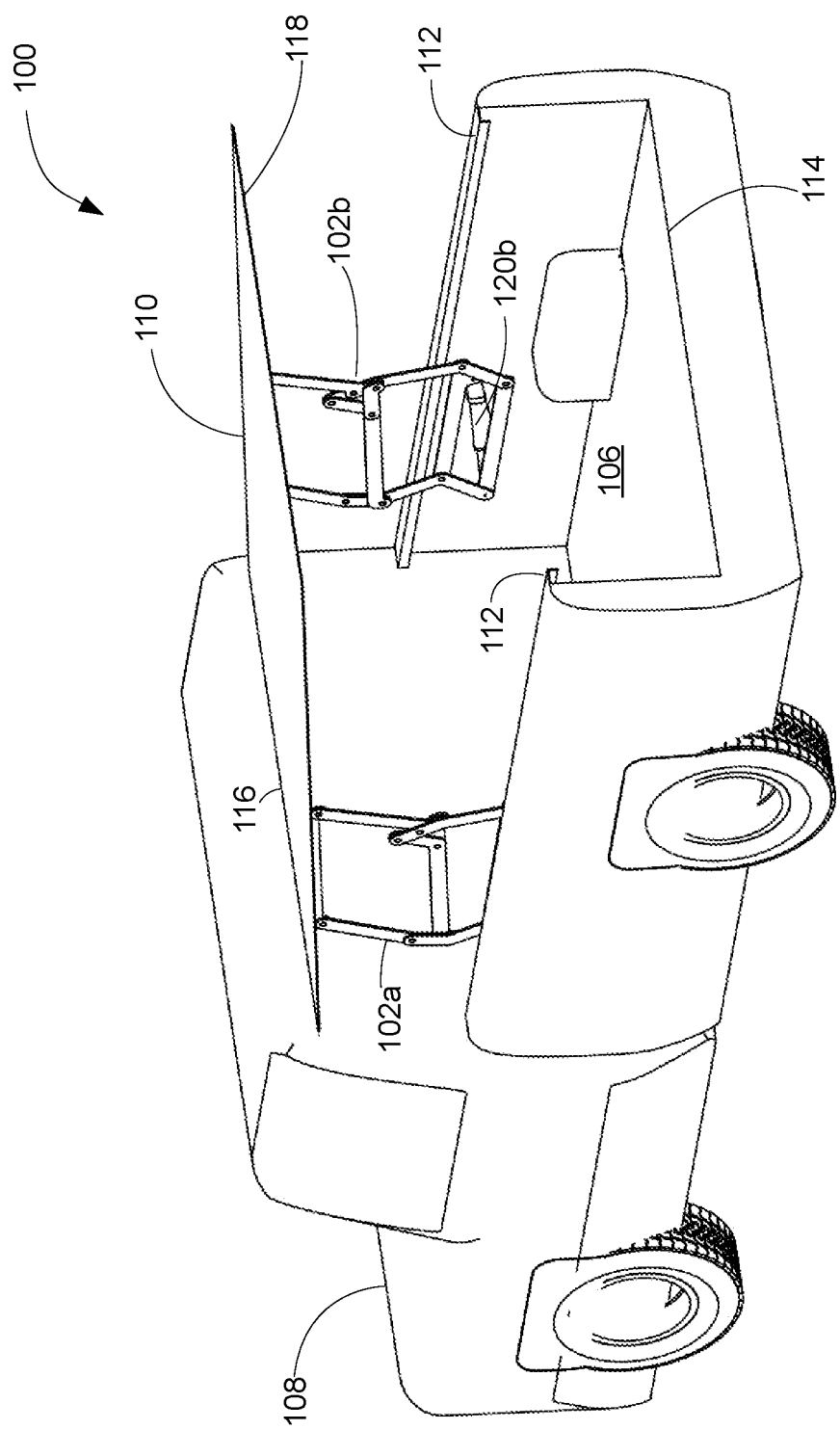
FIG. 2 shows a perspective view of the tonneau cover system of FIG. 1 in a fully opened position according to an exemplary embodiment.

FIG. 1 shows a perspective view of a tonneau cover system 100 in a fully closed position according to an exemplary embodiment. FIG. 2 shows a perspective view of the tonneau cover system 100 of FIG. 1 in a fully opened position.

As illustrated, the tonneau cover system 100 includes two scissor lift assemblies 102a, 102b, a first scissor lift assembly 102a on a left side inner panel 104 of a cargo bed 106 and a second scissor lift assembly 102b on a right side inner panel of the cargo bed 106. The cargo bed 106 is provided on a vehicle 108 being a pickup truck in this embodiment. The system 100 further includes a cover 110 attached to both the first and second scissor lift assemblies 102a, 102b. The lift assemblies selectively raise and lower the cover in a vertical manner.

As illustrated in FIG. 1, in the fully closed position, the scissor lift assemblies 102a, 102b lower the cover 110 down to be level with an upper side railing 112 of the cargo bed 106. In other words, in the closed position, the cover 110 is parallel with the cargo bed floor 114 of the pickup truck 108.

As illustrated in FIG. 2, in the fully opened position, the scissor lift assemblies 102a, 102b, raise the cover 110 up an average of one and a quarter meters (1.25 m) above the upper side railing 112 of the cargo bed 106. However, the cover 110 is no longer level with the side railing 112; instead, the scissor lifts 102a, 102b, are configured such that they raise a front edge 116 of the cover 110 approximately one meter (1 m) above a front edge of the side railing 112 and raise a back edge 118 of the cover 110 approximately one and a half meters (1.5 m) above a back edge of the side railing 112 (i.e., approximately one and a half meters above the tailgate of the pickup truck 108). In this way, the cover 110 has a slope raising from the front edge 116 of the cover 110 to the back edge 118 of the cover 110 in comparison with the floor 114 of the cargo bed 106.

As illustrated in FIG. 2, the right-side scissor lift 102b includes a right-side electric linear actuator 120b that drives the right-side scissor lift 102b. The left-side scissor lift 102a includes a similar structure and includes a left-side electric linear actuator 102a. Together, the right-side and left-side electric actuators 120a, 120b selectively raise and the lower the cover 110 in response to user input. In this embodiment, a plurality of sensors 414 are included for the scissor lifts 102a, 102b and a controller 402 receives sensor signals and drives the electric actuators 120a, 120b in a synchronized manner such the right-side scissor lift 102a and the left-side scissor lift 102b are both raising or lowering the cover substantially the same amount at all times. (see FIG. 24 showing a block diagram of various electronic control components of system 100 including sensors 414 and controller 402.)

Figure 3:
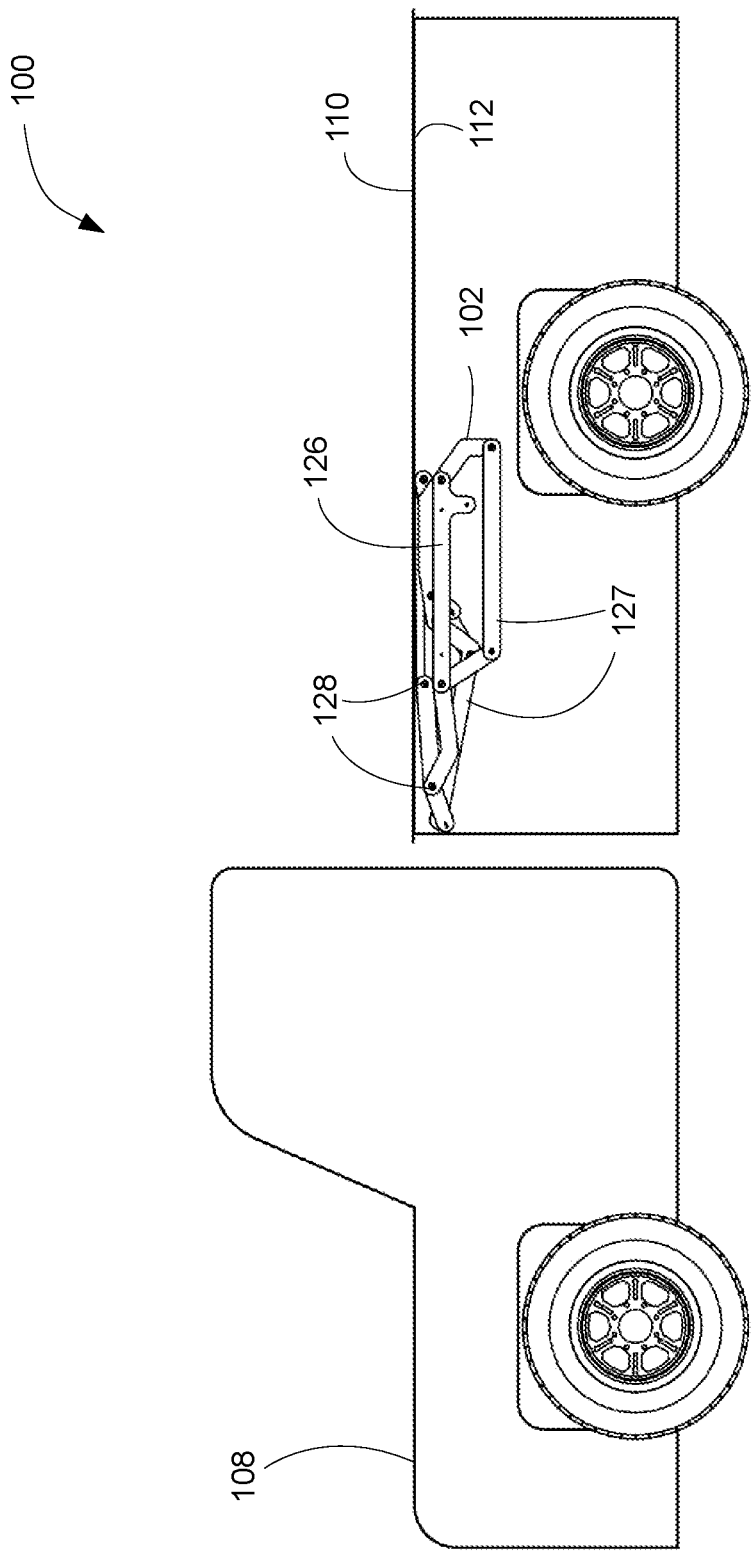
FIG. 3 shows a side view of the tonneau cover system of FIG. 1 illustrating how a scissor lift assembly lowers the cover to be level with the upper sidewalls of the cargo bed in the fully closed position.

FIG. 3 shows a side view of the tonneau cover system of FIG. 1 illustrating how a scissor lift assembly 102 lowers the cover 110 to be level with the upper sidewalls 112 of the cargo bed 106 in the fully closed position. The view shown in FIG. 3 is of the left-side of the vehicle 108 as seen by an observer external to the vehicle 108 looking toward the left side of the vehicle 108. However, a similar structure is also present on the right-side.

The electric linear actuator 120 is omitted from this diagram to more clearly illustrate how the various arms of the scissor lift assembly 102 fold up in the fully closed position. The arms are more fully described below starting at FIG. 8; however, at this point it is useful to note that scissor assembly 102 in this embodiment includes a single fixed arm 126 and a plurality of movable arms 127. The fixed arm 126 is mounted directly to the inner sidewall 104 of the vehicle's cargo bed 106 while the moveable arms 127 are mounted to the fixed arm 126 and/or or other moveable arms 127. There are a plurality of pivot points 128 coupling the various arms 126, 127 together with one another.

Figure 4:
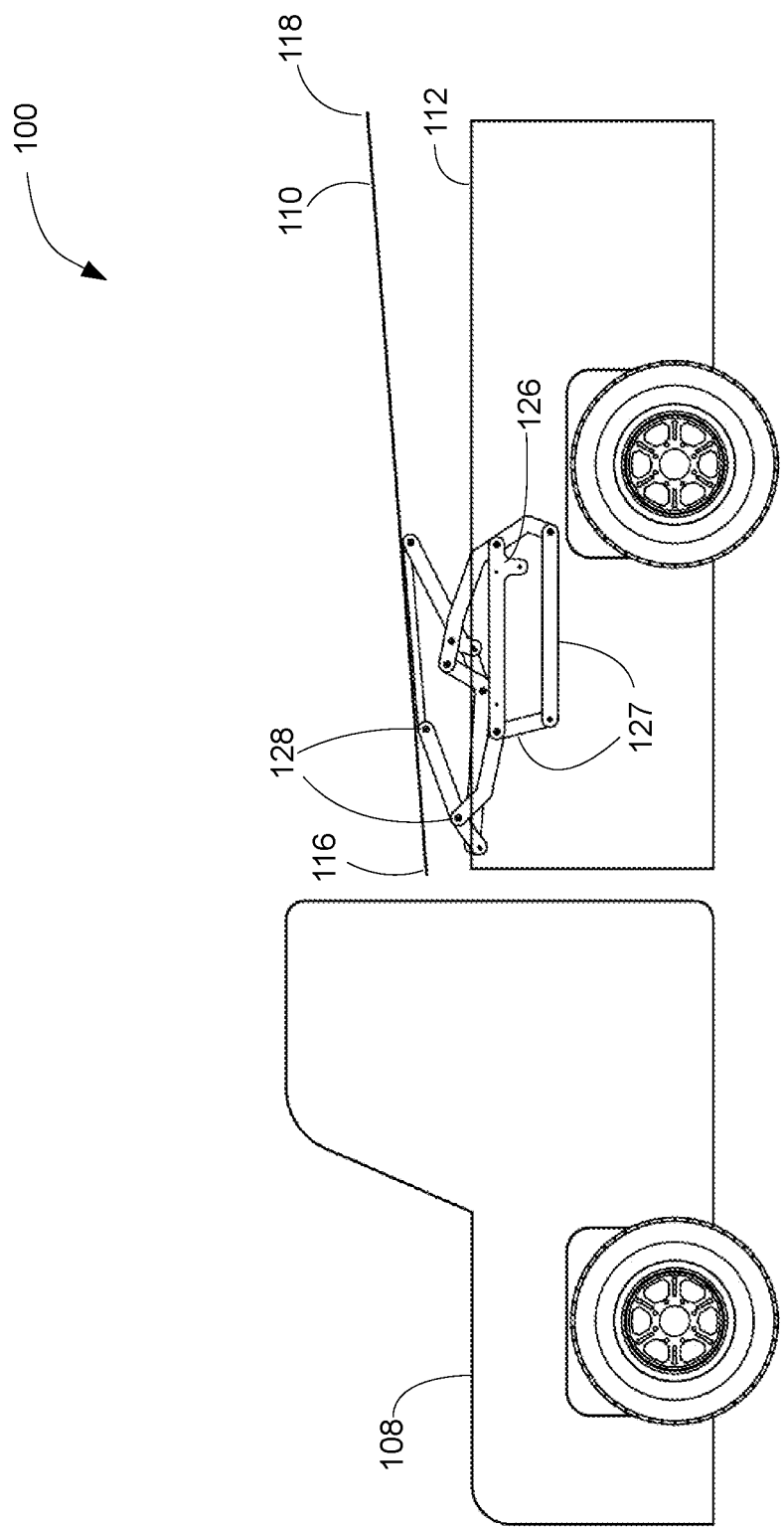
FIG. 4 shows a side view of the tonneau cover system of FIG. 1 illustrating how the scissor lift assembly raises the cover with a sloped orientation in a first partially opened position example.

FIG. 4 shows a side view of the tonneau cover system 100 of FIG. 1 illustrating how the scissor lift assembly 102 raises the cover 110 with a sloped orientation in a first partially opened position example. In comparing FIG. 4 with FIG. 3, it can be seen that the fixed arm 126 stays in the same position while the moveable arms 127 are moved to new positions of result of being rotated around their various pivot points 128. The structure of the arms including their shapes, relative distances and pivot point 128 locations causes the front edge 116 of the cover 110 to be raised a lesser distance from the upper side wall 112 of the cargo bed 106 than the back edge 118 of the cover 110.

Figure 5:
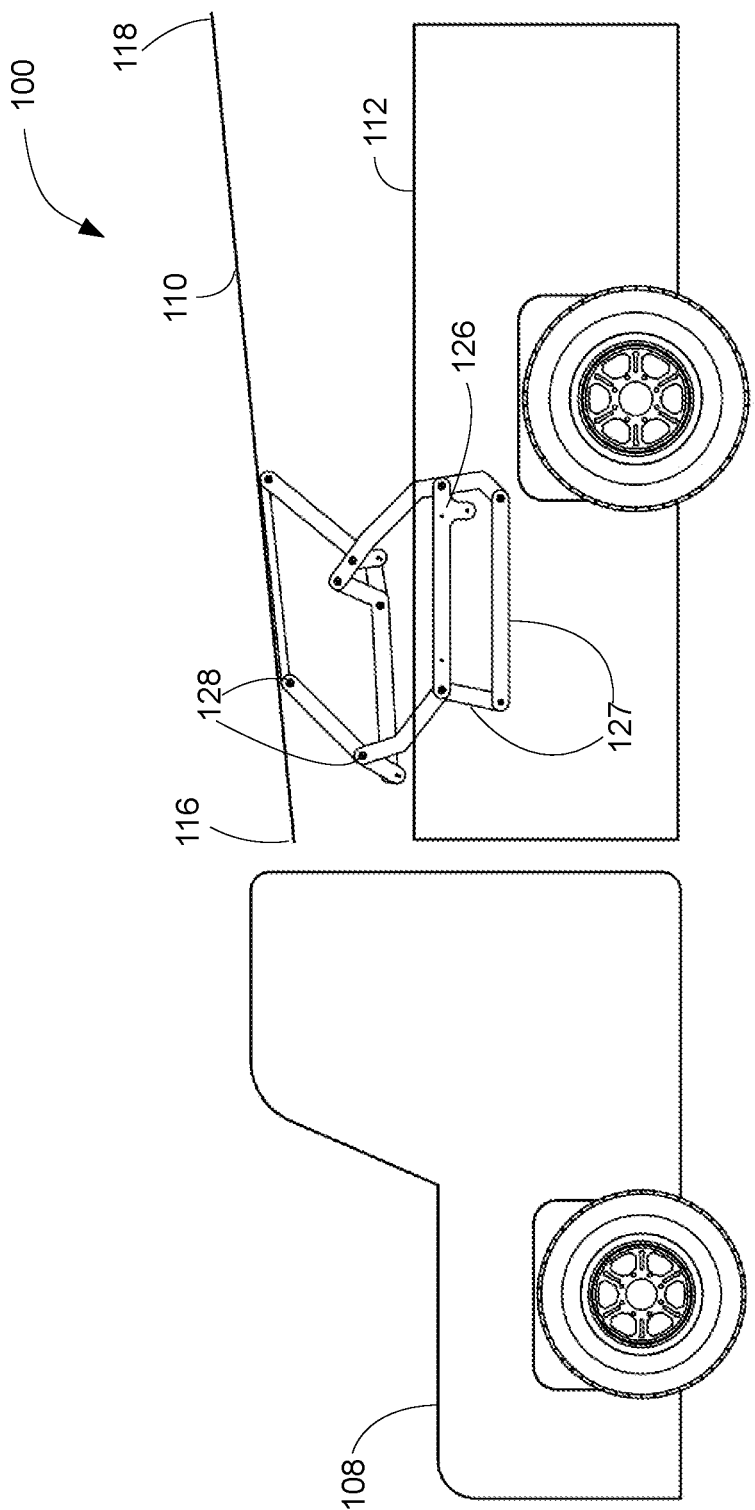
FIG. 5 shows a side view of the tonneau cover system of FIG. 1 illustrating how the scissor lift assembly further raises the cover with the sloped orientation in a second partially opened position example.

FIG. 5 shows a side view of the tonneau cover system of FIG. 1 illustrating how the scissor lift assembly 102 further raises the cover 110 with the sloped orientation in a second partially opened position example. Again, the fixed arm 126 stays in the same position while the moveable arms 127 are further rotated around their various pivot points 128 in order to further extend the scissor lift assembly 102 upwards in the vertical direction. As before, the front edge 116 of the cover 110 is raised less than the back edge 118 of the cover 110 such that the cover 110 has a slope going upwards from the front edge 116 to the back edge 118.

Figure 6:
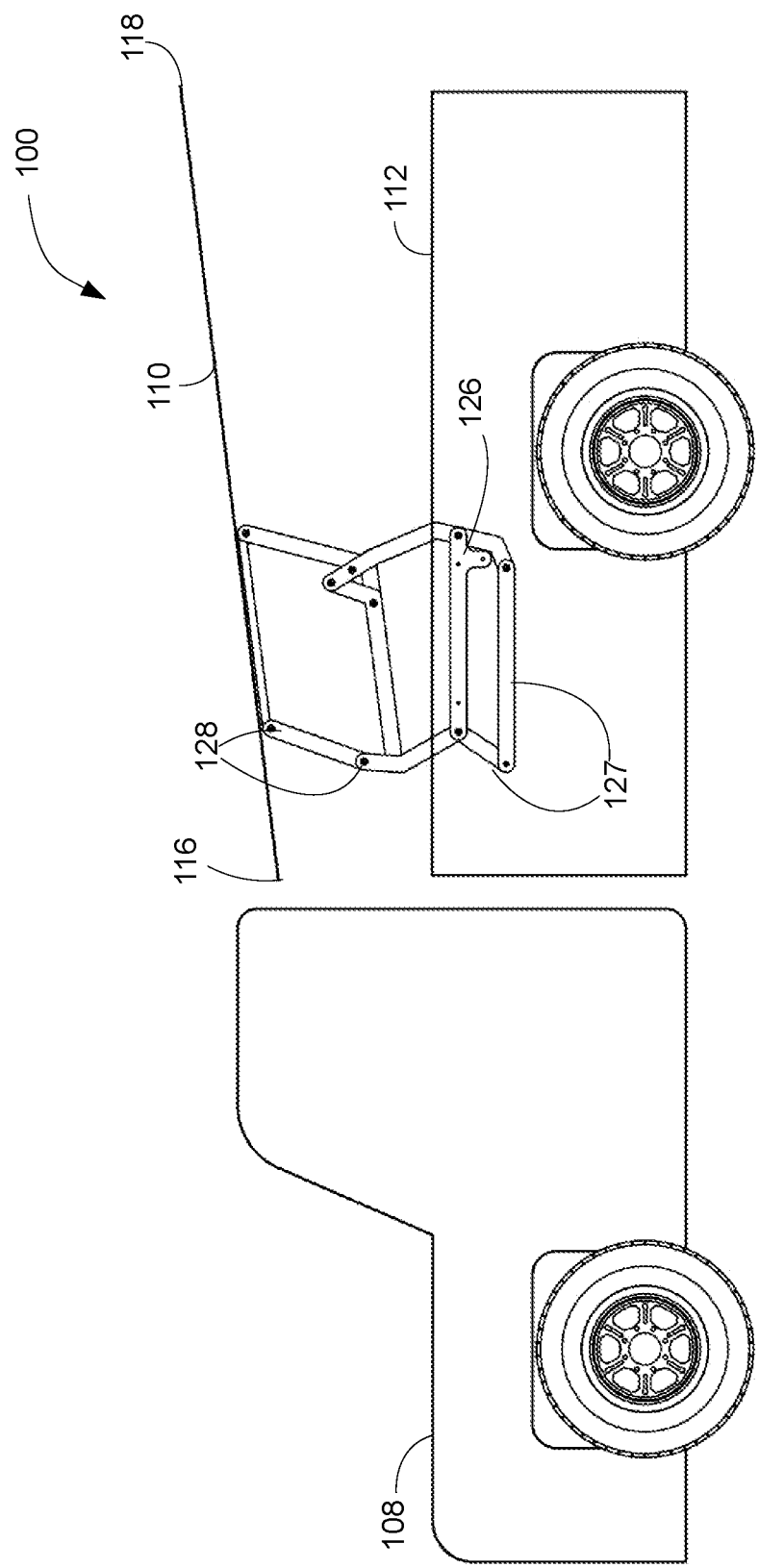
FIG. 6 shows a side view of the tonneau cover system of FIG. 1 illustrating how the scissor lift assembly further raises the cover with the sloped orientation to a fully opened position.

FIG. 6 shows a side view of the tonneau cover system 100 of FIG. 1 illustrating how the scissor lift assembly 102 further raises the cover 110 with the sloped orientation to a fully opened position. The fixed arm stays 126 in the same position as it is mounted in a fixed manner to the inner sidewall 104 of the cargo bed 106. The moveable arms 127 are rotated around their pivot points 128 such that the cover 110 is raised above the cargo bed sidewalls 112 thereby allowing access to items stored within the cargo bed 106. As with the other positions, the cover 110 has an upward slope from front edge 116 to back edge 118.

Figure 7:
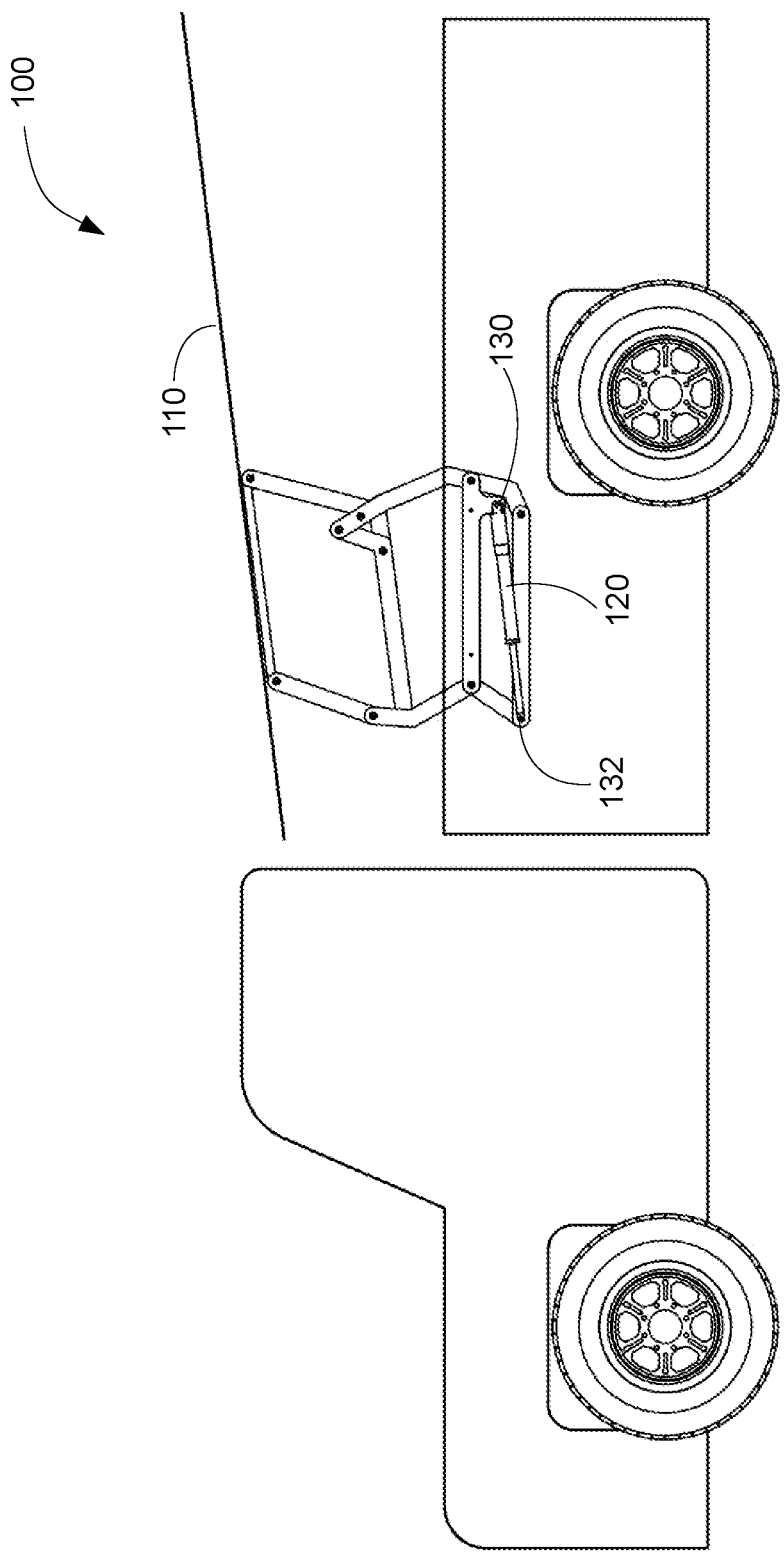
FIG. 7 shows a side view of the tonneau cover system of FIG. 1 illustrating how an electric linear actuator is positioned between a fixed anchor point and a movable pivot point in order to selectively raise and lower the scissor lift assembly under electrical power according to an exemplary embodiment.

FIG. 7 shows a side view of the tonneau cover system of FIG. 1 illustrating how an electric linear actuator 120 is positioned between a fixed anchor point 130 and a movable drive point 132 in order to selectively raise and lower the scissor lift assembly under electrical power according to an exemplary embodiment. The electric linear actuator 120 causes the moveable arms 127 to rotate around their respective pivot points 128 in order to selectively raise and lower the cover 110. The electric actuator 120 is positioned between the anchor point 130 provided on the fixed arm 126 and the drive point 132 diagonally opposite the anchor point 130 being a pivot point 128 between two of the moveable arms 127.

The linear actuator dynamically 120 changes its length under electric power in accordance with a control signal. For example, in some embodiments, in response to a positive control signal, the length of the linear actuator 120 extends. As long as the positive control signal is present, the linear actuator 120 continues to extend its length until a maximum limit is reached representing a maximum allowable length (i.e., fully extended). The maximum allowable length is illustrated in FIG. 7. At this length, the linear actuator 120 pushes the drive point 132 a predetermined maximum distance away from the fixed anchor point 130, and this amount of separation of the drive point 132 from the anchor point 130 causes the various movable arms 127 of the scissor lift 102 to rotate such that the scissor lift 102 fully raises the cover 110 as shown in FIG. 7.

Likewise, in response to a negative control signal, the length of the linear actuator 120 retracts. As long as the negative control signal is present, the linear actuator 120 continues to retract its length until a minimum limit is reached representing a minimum allowable length (i.e., fully retracted). The minimum allowable length is illustrated in FIG. 3. At this length, the linear actuator 120 pulls the drive point 132 a predetermined minimum distance toward the anchor point 130, and this amount of separation of the drive point 132 from the anchor point 130 causes the various moveable arms 127 of the scissor lift 102 to rotate around their respective pivot points 128 such that the scissor lift 102 fully lowers the cover 110 as shown in FIG. 3.

Figure 8:
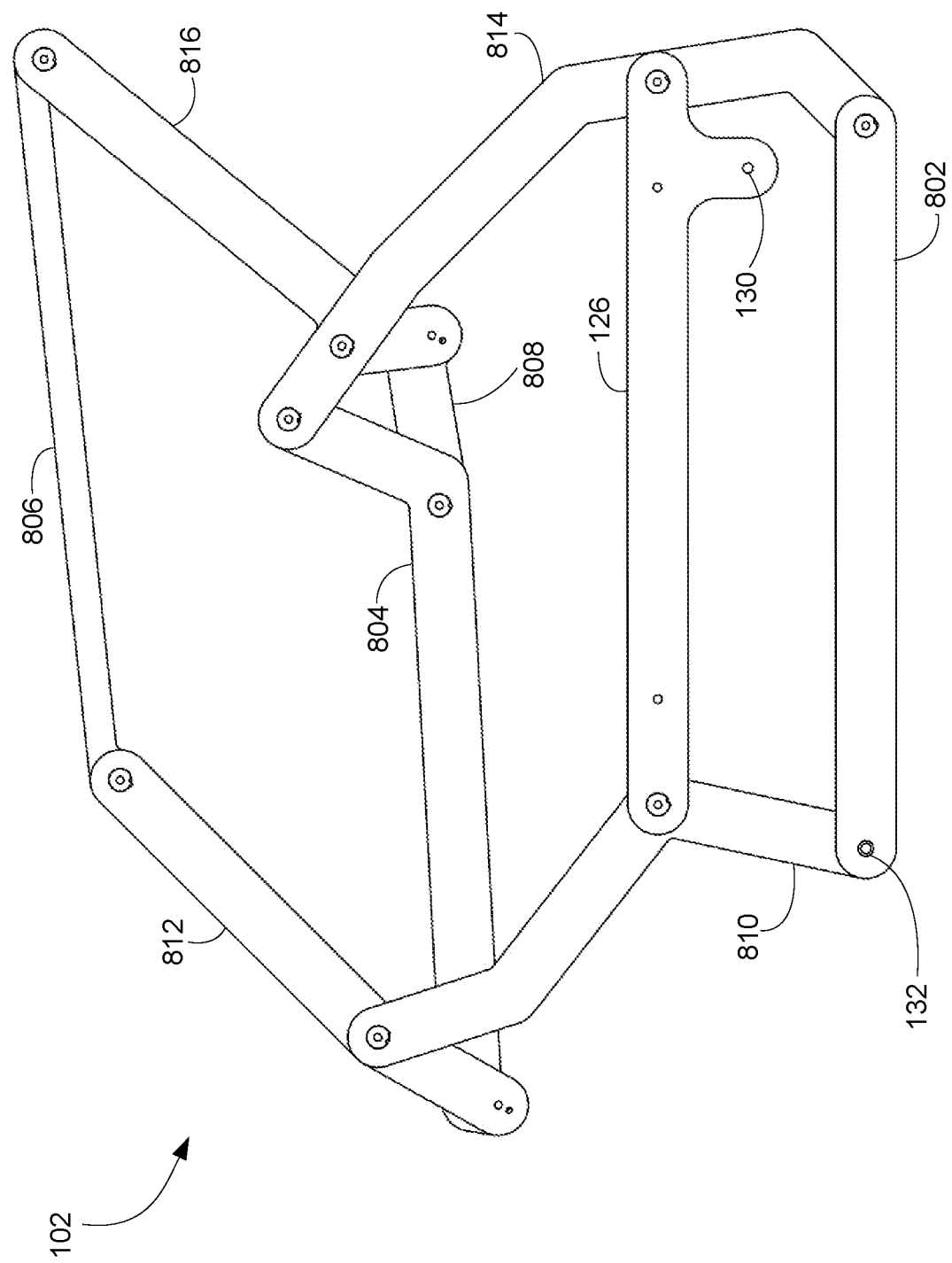
FIG. 8 shows a plurality of arms forming the scissor lift assembly according to an exemplary embodiment.

FIG. 8 shows a plurality of arms forming the scissor lift assembly 102 according to an exemplary embodiment. In this embodiment, each scissor lift 102 includes nine arms as follows:

| Reference | Part name |
| --- | --- |
| 126 | Fixed arm |
| 802 | Bottom arm |
| 804 | Middle arm |
| 806 | Top arm |
| 808 | Short connector arm |
| 810 | Front lower arm |
| 812 | Front upper arm |
| 814 | Back lower arm |
| 816 | Back upper arm |

The fixed arm 126 is mounted to the inner side panel 104 of the cargo bed 106 of the vehicle 108 and does not move. The front lower arm 810 is pivotally attached to the fixed arm 126, the bottom arm 802, and the front upper arm 812. The bottom arm 802 is pivotally attached to the front lower arm 810 and the back lower arm 814. The middle arm 804 is pivotally attached to the front upper arm 812 and the back lower arm 814. The top arm 806 is pivotally attached to the front upper arm 812 and the back upper arm 816. The short connector arm 808 is pivotally attached to the middle arm 804 and the back upper arm 816. The front upper arm 812 is pivotally attached to the middle arm 804, the front lower arm 810, and the top arm 806. The back lower arm 814 is pivotally attached to the bottom arm 802, the fixed arm 126, the back upper arm 816, and the middle arm 804. Finally, the back upper arm 816 is pivotally attached to the short connector arm 808, the back lower arm 814, and the top arm 806.

Figure 9:
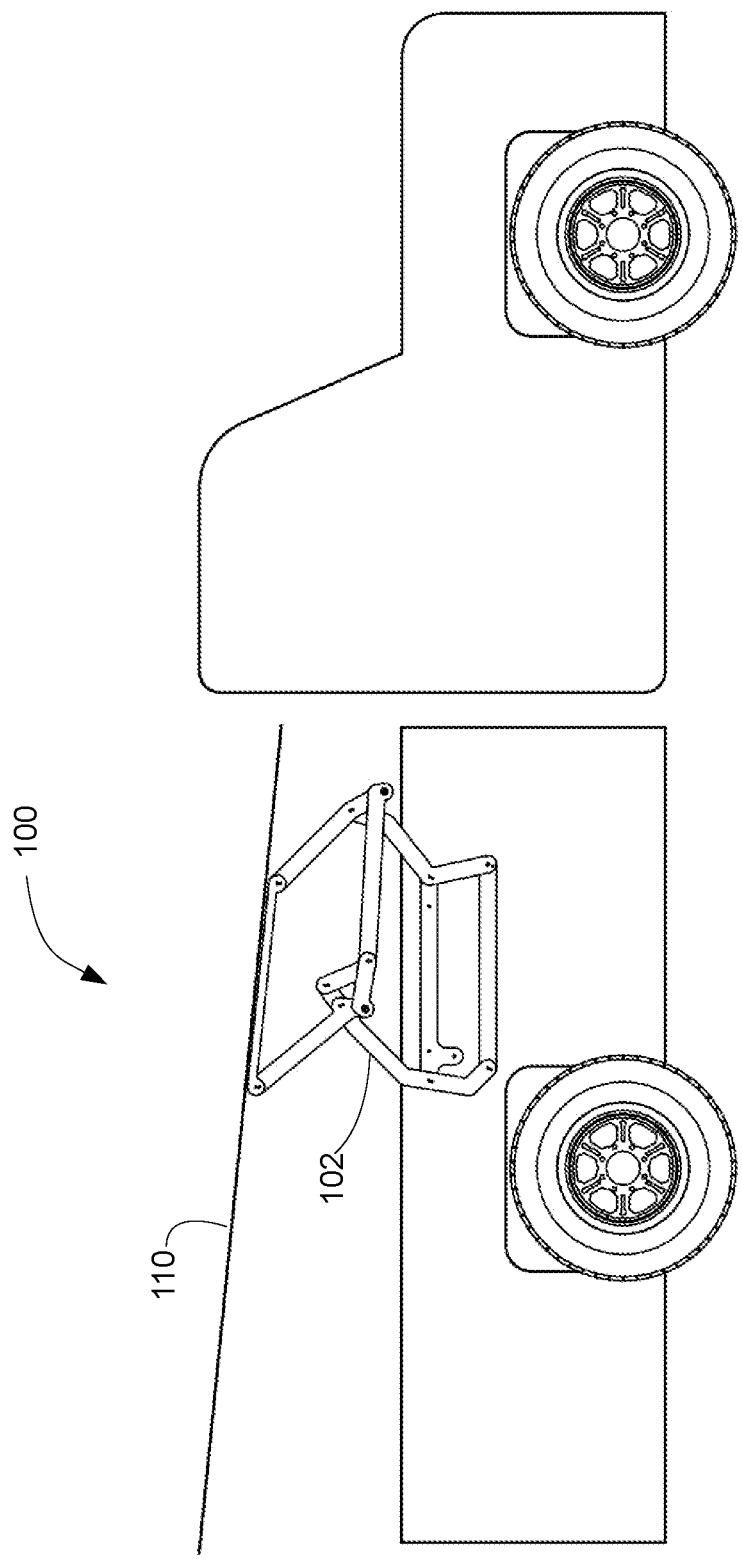
FIG. 9 shows a side view of the tonneau cover system of FIG. 1 as seen looking at the scissor lift assembly from within the cargo bed.
Figure 10:
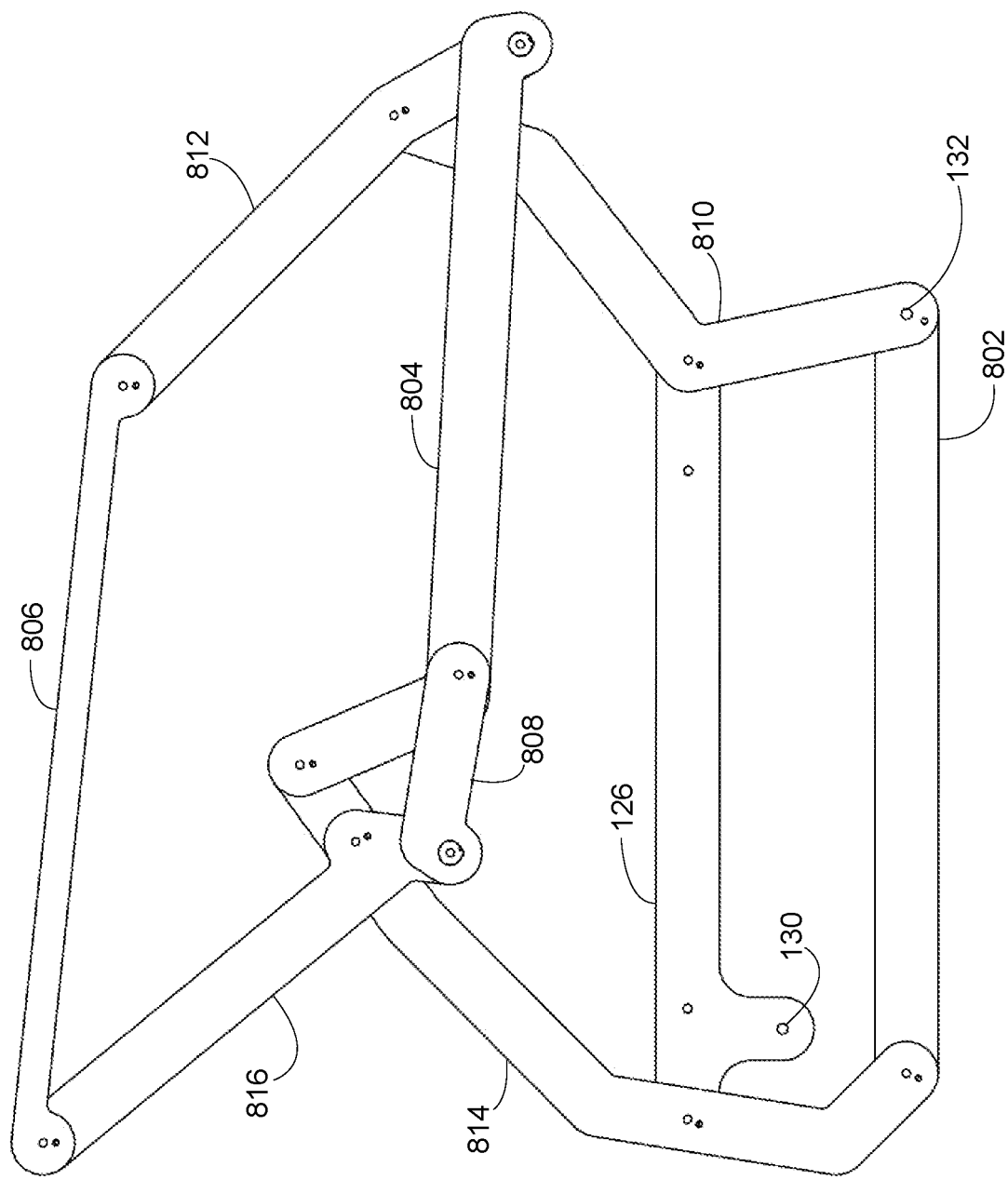
FIG. 10 shows the plurality of arms forming the scissor lift assembly of FIG. 8 as seen looking at the scissor lift assembly from within the cargo bed.

FIG. 9 shows a side view of the tonneau cover system 110 of FIG. 1 as seen looking at the scissor lift assembly 102 from within the cargo bed 106, and FIG. 10 shows the plurality of arms forming the scissor lift assembly 102 of FIG. 8 as seen looking at the scissor lift assembly 102 from within the cargo bed 108. The views shown in FIG. 9 and FIG. 10 are of the left-side of the vehicle; however, unlike FIG. 3 and FIG. 8, FIG. 9 and FIG. 10 are as seen by an observer within the cargo bed 106 looking toward the left sidewall 104 of the cargo bed 104.

Figure 12:
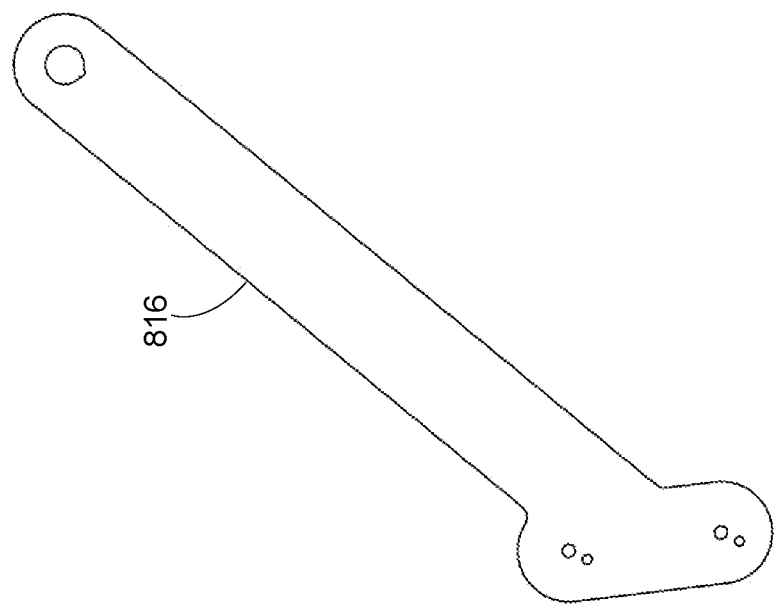
FIG. 12 shows a side view of the back upper arm of the scissor lift assembly of FIG. 8.
Figure 11:
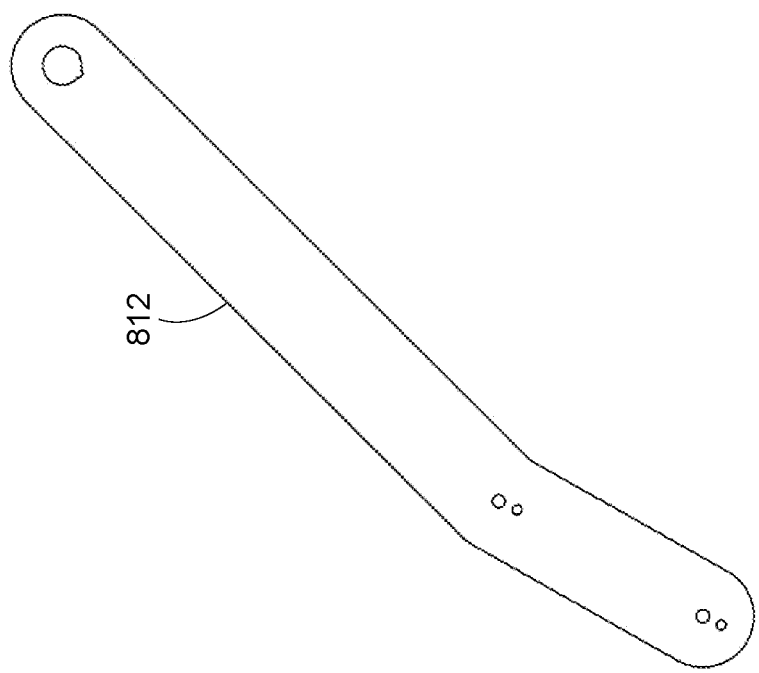
FIG. 11 shows a side view of the front upper arm of the scissor lift assembly of FIG. 8.
Figure 15:
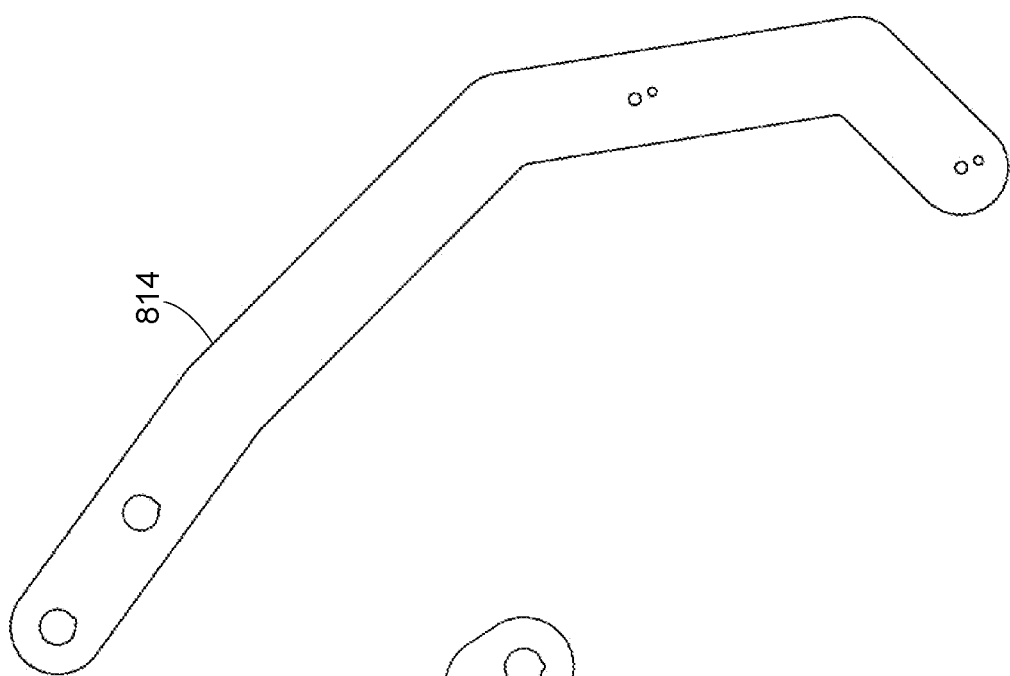
FIG. 15 shows a side view of the back lower arm of the scissor lift assembly of FIG. 8.
Figure 14:
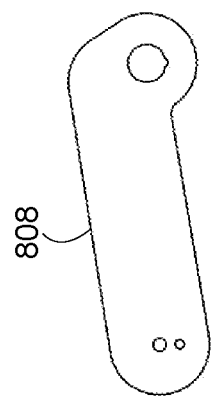
FIG. 14 shows a side view of the short connector arm of the scissor lift assembly of FIG. 8.
Figure 13:
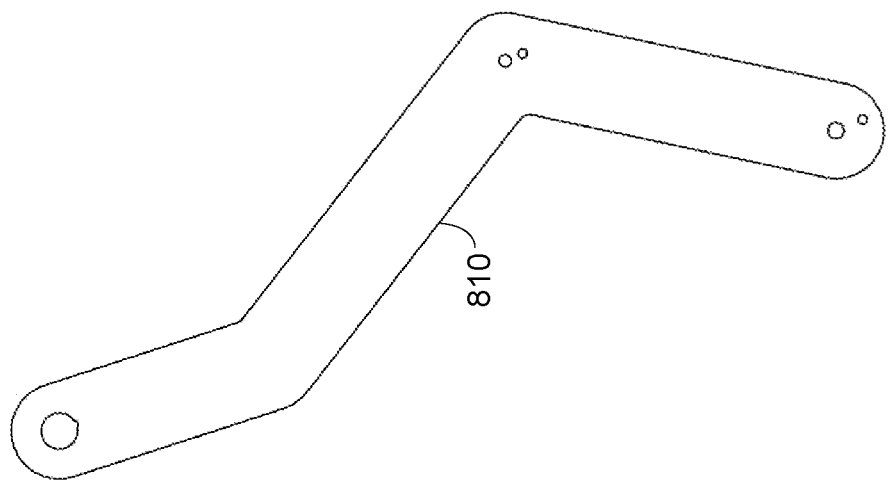
FIG. 13 shows a side view of the front lower arm of the scissor lift assembly of FIG. 8.
Figure 16:
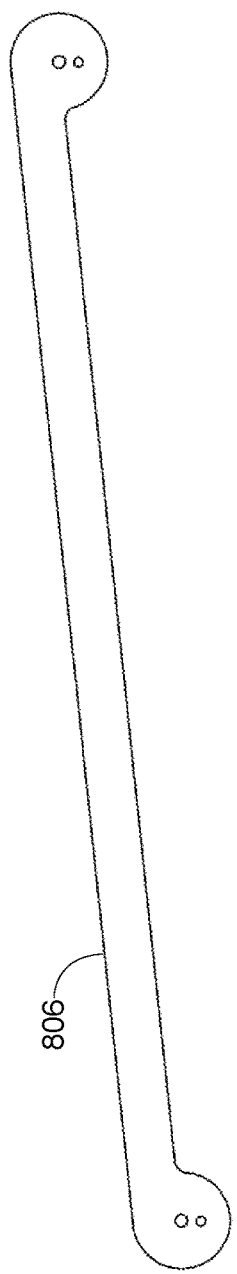
FIG. 16 shows a side view of the top arm of the scissor lift assembly of FIG. 8.
Figure 17:
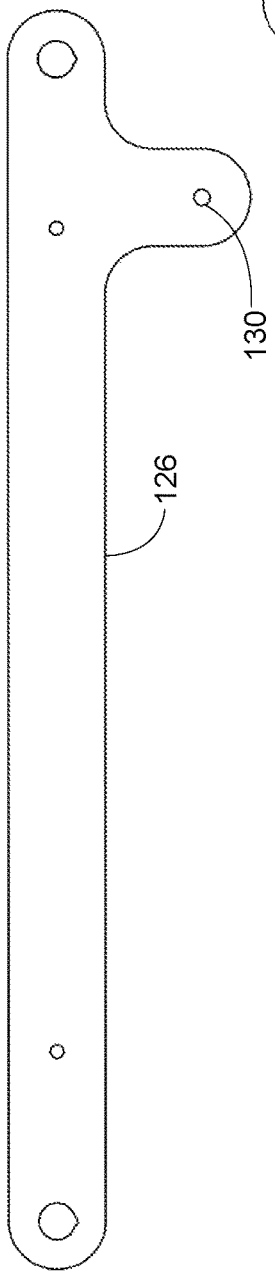
FIG. 17 shows a side view of the fixed arm of the scissor lift assembly of FIG. 8.
Figure 18:
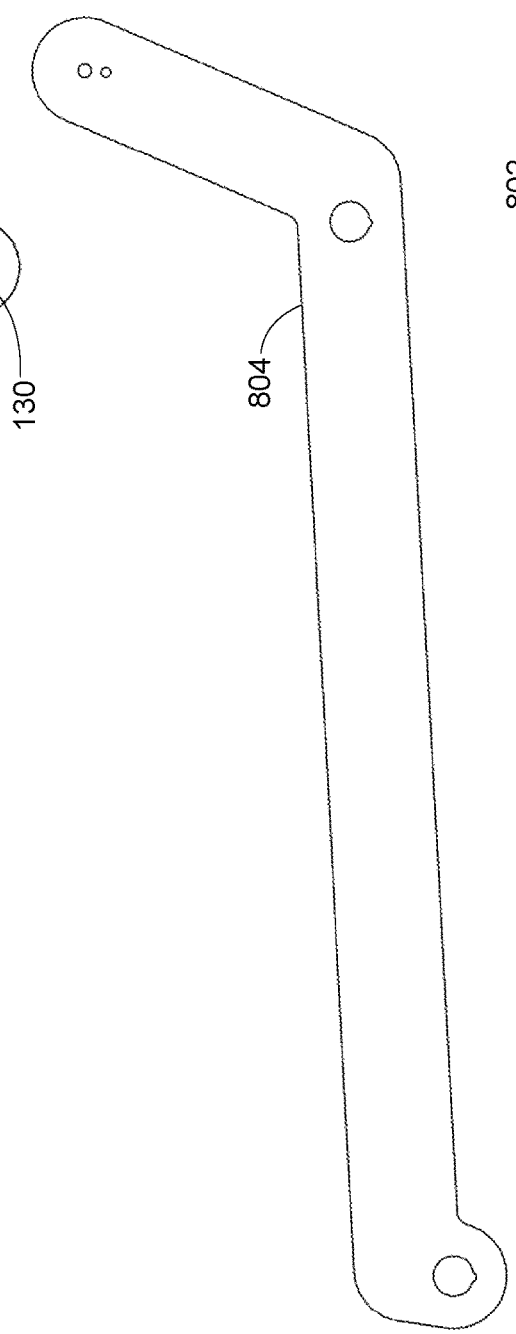
FIG. 18 shows a side view of the middle arm of the scissor lift assembly of FIG. 8.
Figure 19:
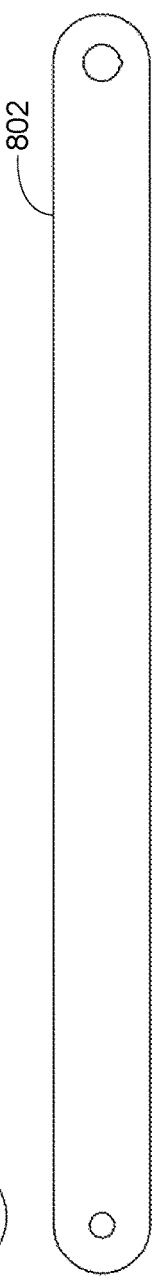
FIG. 19 shows a side view of the bottom arm of the scissor lift assembly of FIG. 8.

FIGS. 11 to 19 illustrate a close up views of each of the arms of the scissor assembly 102 as would be seen by the external viewer looking toward the left side of the vehicle 108 (i.e., the viewing angle of FIG. 8). In particular, FIG. 11 shows a side view of the front upper arm 812, FIG. 12 shows a side view of the back upper arm 816, FIG. 13 shows a side view of the front lower arm 810, FIG. 14 shows a side view of the short connector arm 808, FIG. 15 shows a side view of the back lower arm 814, FIG. 16 shows a side view of the top arm 806, FIG. 17 shows a side view of the fixed arm 126, FIG. 18 shows a side view of the middle arm 804, and FIG. 19 shows a side view of the bottom arm 802.

Figure 20:
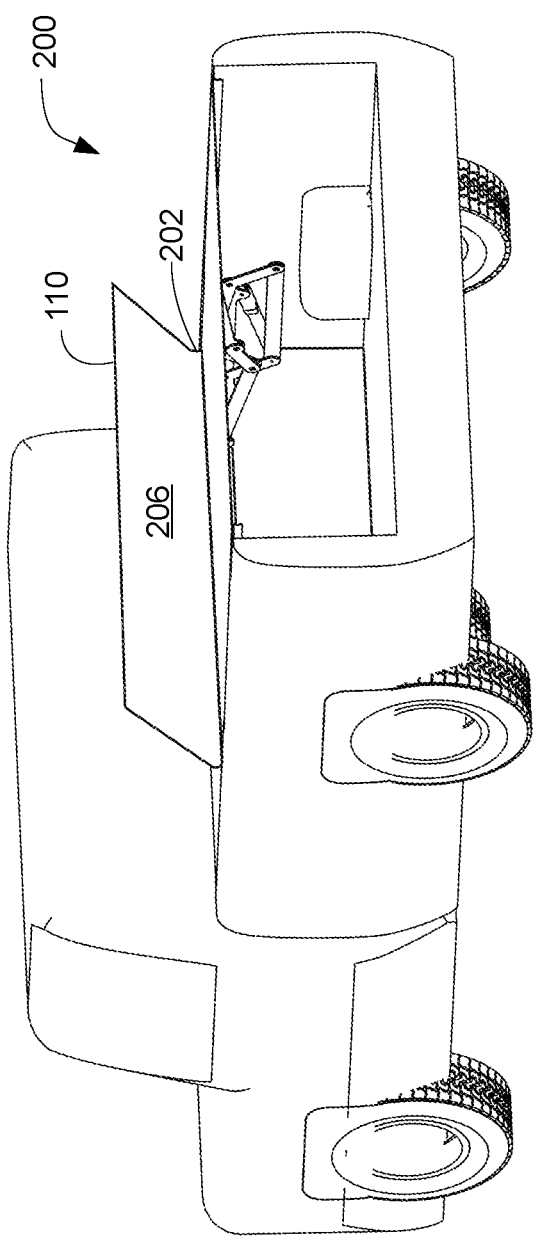
FIG. 20 shows a perspective view of a tonneau cover system in the closed position with a foldable section of the cover opened according to an exemplary embodiment.
Figure 21:
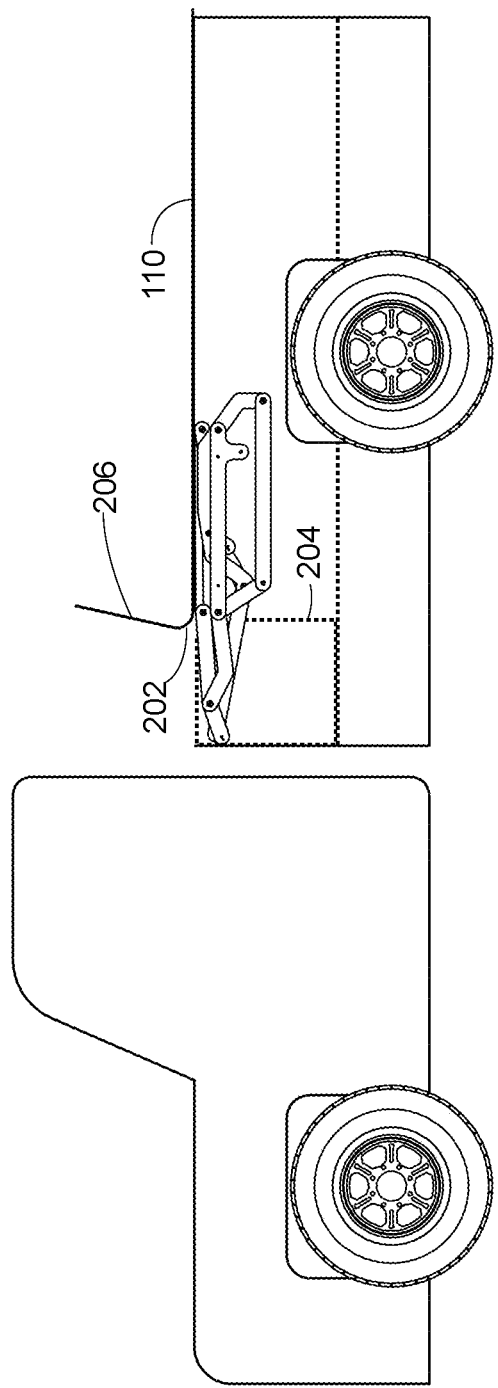
FIG. 21 shows a side view of the tonneau cover system of FIG. 20 having the foldable section of the cover opened to allow access to a toolbox or other item in the cargo area.

FIG. 20 shows a perspective view of a tonneau cover system 200 in the closed position with a foldable section 206 of the cover 110 folded upwards along a fold line 202 according to an exemplary embodiment, and FIG. 21 shows a side view of the tonneau cover system of FIG. 20 having the foldable section 206 of the cover 110 opened to allow access to a toolbox 204 or other item in the cargo area 106.

In this embodiment, a toolbox 204 or other item(s) located at a forward section of the cargo bed 106 can be accessed without activating the electric actuators 120 of the scissor lift assemblies 102. Instead, while the cover 110 is in the closed position, a front section 206 of the cover 110 can be folded back. One or more latches, clips, or other attachments means may secure the front section 206 in the downward position such that the cover 110 is flat when not desired to be opened. A user may access the toolbox 204 or other items by unlocking the clips or other attachment mechanism and then folding back the front section 206 of the cover 110.

Although not shown, in other embodiments, a back section of the cover 110 may also be foldable in an upwards direction in a similar manner in order to allow access to one or more items in a rear section of the cargo bed 106.

FIG. 22 shows a perspective view of a tonneau cover system 300 in the raised position with a cover 110 having detachable side sections 302a, 302b shown in the detached position according to an exemplary embodiment. FIG. 23 shows a side view of the tonneau cover system 300 of FIG. 22 having the detachable side sections 302a, 302b of the cover 110 shown in the detached position.

In this embodiment, the cover 110 is detachable along a line 304 that runs front to back along a lengthwise direction of the cover 110. Hinges 306 or other rotating means are provided on the top bar 806 such that, when detached, the cover sections 302a, 302b can rotate to hang downward from the top bar 806 of each side's scissor lift assembly 102. This embodiment is useful to open up the cover 110 to allow workers or other people to climb up and stand on the floor of the cargo bed 106 without hitting their head on the cover 110. Likewise, in this embodiment, the toolbox 204 can be accessed from a user who stands on the cargo bed floor 106.

In some embodiments, the hinges 306 may also allow rotating the cover sections 302a, 302b to hang on either the inside or the outside of the scissor lift assemblies 102.

FIG. 24 shows a block diagram of an electronics control system 400 for controlling an automated tonneau cover system 100, 200, 300 according to an exemplary embodiment. The control system 400 includes a controller 402 coupled to a right-side lift assembly 102a and a left-side lift assembly 102b. The controller 402 includes one or more processors 404 coupled to one or more storage devices 406, one or more communications interfaces 408 and a wireless receiver 410. The storage devices 406 store therein controller module software 410 for execution by the one or more processors 404.

The one or more processors 404 may be included in a central processor unit (CPU) of a computer server acting as the controller 402. In the following description the plural form of the word "processors" will be utilized as it is common for a CPU of a computer server to have multiple processors 404 (sometimes also referred to as cores); however, it is to be understood that a single processor 404 may also be configured to perform the described functionality in other implementations.

Each of the lift assemblies 102 includes one or more sensors 414 and an actuator 416. In particular, the left-side lift assembly includes left-side sensors 414b and actuator 416b, and the right-side lift assembly 102a includes right-side sensors 414a and actuator 416a.

A battery 418 provides power to the electronics of the controller 402 and right and left-side lift assemblies 102a, 102b. In some embodiments, the battery 418 is the vehicle's 12V battery utilized for other functions such as starting the engine and providing power to other vehicle 108 electronics. In some embodiments, the battery 418 is separate from that vehicle's battery and is mounted to the floor or sidewall of the cargo bed 106. A wireless remote device 420 such as a fob carried by a user sends wireless signals to the controller 402 for operating the lift assemblies 102. Likewise, one or more wired buttons 422 coupled to the controller are provided for a user to operate the lift assemblies 102 such as from within a cab of the vehicle 108 or by a tailgate of the cargo area 106, for example.

Figure 25:
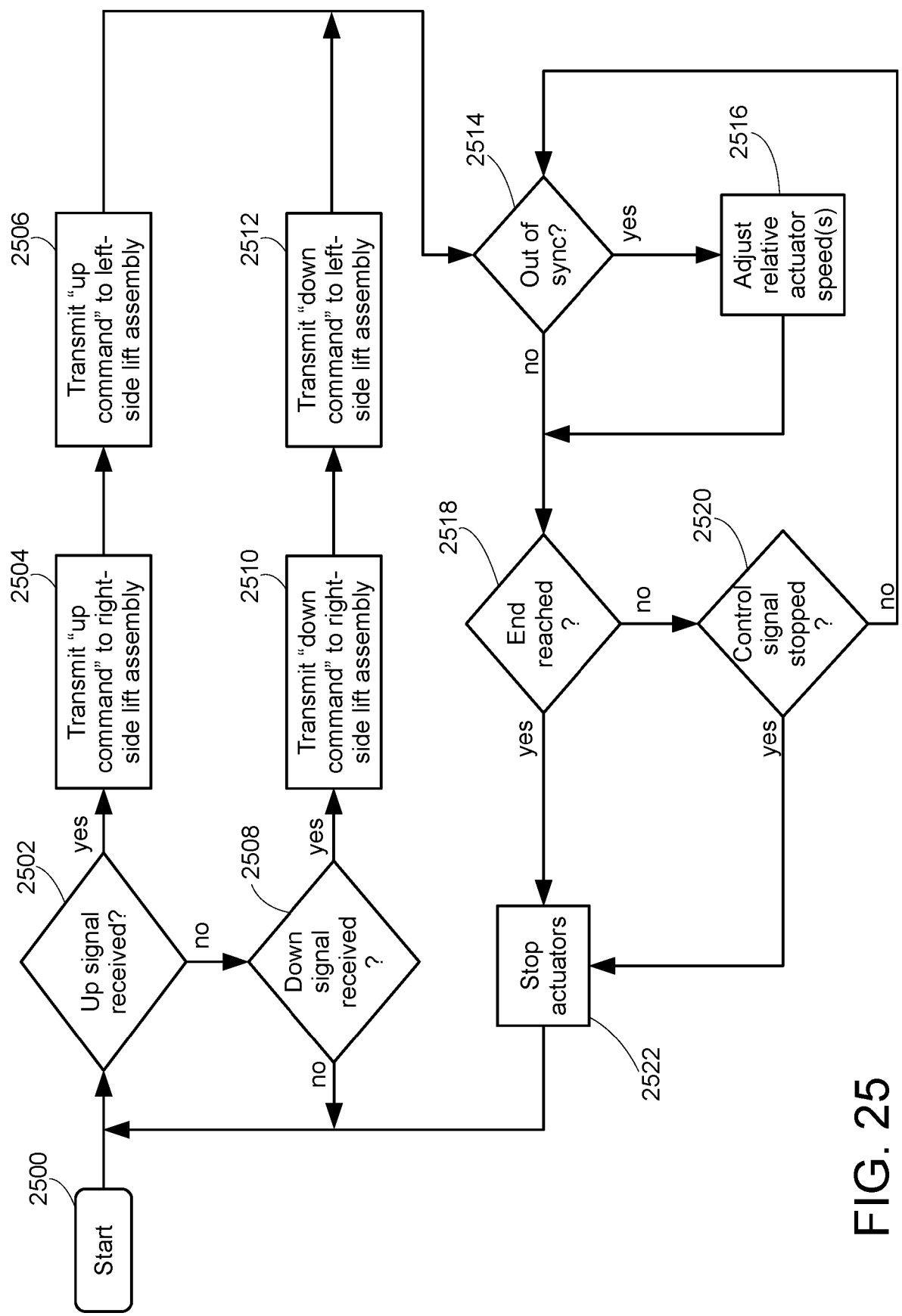
FIG. 25 shows a flowchart of operations performed by the controller of FIG. 24 for controlling the automated tonneau cover according to an exemplary embodiment.

FIG. 25 shows a flowchart of operations performed by the controller of FIG. 24 for controlling the automated tonneau cover system 100, 200, 300 according to an exemplary embodiment. The steps of FIG. 25 may be performed by one or more processors 404 of the controller 402 executing the controller module software 412 loaded from the storage device 406 in combination with the electric actuators 120 and/or sensors 414 of the lift assemblies 102. The steps of the flowchart are not restricted to the exact order shown, and, in other configurations, shown steps may be omitted or other intermediate steps added.

The process begins at step 2500 such as when power is coupled to the controller 402. In some embodiments, the battery 418 always provides power to the controller 402 such that the cover 110 may be raised at any time. In other embodiments, a switch is provided to only provide power at certain times such as when the vehicle 108 ignition power is engaged. A timer may be included to limit power to controller 402 only within a predetermined time period from when the vehicle 108 ignition is disengaged.

At step 2502, the controller 402 determines whether an up signal is received according to user input. The up signal may correspond to a particular frequency, tone, voltage, code, or other value as received from one of the buttons 422 and/or remote 420. When the up signal is received, control proceeds to step 2504; otherwise, control proceeds to step 2508.

At step 2504, the controller 402 transmits an up command to the electric actuator 120a for the right-side lift assembly 102a. The up command may correspond to a particular frequency, tone, voltage, code, or other value transmitted to the right-side actuator 120a.

At step 2506, the controller 402 transmits an up command to the electric actuator 120b for the left-side lift assembly 102b. The up command may correspond to a particular frequency, tone, voltage, code, or other value transmitted to the left-side actuator 102b.

At step 2508, the controller 402 determines whether a down signal is received according to user input. The down signal may correspond to a particular frequency, tone, voltage, code, or other value as received from one of the buttons 422 and/or remote 420. When the down signal is received, control proceeds to step 2504; otherwise, control returns back to step 2502 to check for the up signal.

At step 2510, the controller 402 transmits a down command to the electric actuator 120a for the right-side lift assembly 102a. The down command may correspond to a particular frequency, tone, voltage, code, or other value transmitted to the right-side actuator 102a.

At step 2512, the controller 402 transmits a down command to the electric actuator 120b for the left-side lift assembly 102b. The up command may correspond to a particular frequency, tone, voltage, code, or other value transmitted to the left-side actuator 102b.

At step 2514, the controller 402 receives sensor 414 values and determines whether the right electric actuator 120a and left electric actuator 120b are out of sync with each other. In some embodiments, the sensors 414 are potentiometers that provide a voltage representing a distance that the actuator 120 has been extended. As long as the potentiometer voltages received from the right-side and left-side electric actuators 120a, 120b are within a threshold voltage of one another, the controller 402 determines that the two sides 102a, 102b are in sync with each other. In this case, control proceeds to step 2518. However, if the two potentiometer voltages differ by more than the predetermined threshold voltage; the controller determines that the electric actuators 120a, 120b are out of sync with each other and control proceeds to step 2516.

At step 2516, the controller 402 adjusts the up or down signals being sent to the two sides' electric actuators 120a, 120b in order to bring them into sync with each other. For instance, if the direction being sent is an up (raising the cover 110) and the right side actuator 120b has been extended more than the left side actuator 120a, the controller 402 may momentarily pause the right side to thereby allow the left side to "catch up". Alternatively, the controller 402 may momentarily increase a speed of the left side actuator 120a being extended such as by raising the amplitude of the up command being transmitted to the left side. In yet another technique, the controller 402 may momentarily decrease the speed of the right side actuator 120b being extended such as by lowering the amplitude of the up command being transmitted to the right side.

On the other hand, if the direction being sent is down (lowering the cover) and the right side has been retracted more than the left side, the controller 402 may momentarily pause the right side to thereby allow the left side to "catch up". Alternatively, the controller 402 may momentarily increase a speed of the left side actuator 120a being retracted such as by raising the amplitude of the down command being transmitted to the left side. In yet another technique, the controller 402 may momentarily decrease the speed of the right side actuator 120b being retracted such as by lowering the amplitude of the down command being transmitted to the right side.

At step 2518, the electric actuators 120a, 120b determine whether they have reached an end limit that represents either fully extended or fully retracted. In this embodiment, each electric actuator 120 has a built-in sensor that detects when the actuator 120 is fully extended and fully retracted. When an end limit is reached, control proceeds to step 2520; otherwise, if no end limit is reached, control proceeds to step 2520.

At step 2520, the controller 402 determines whether the up signal or down signal that was previously being received at one of steps 2502 or 2508 has been stopped by the user. In this embodiment, the cover 110 can be raised or lowered to any user-desired position between the fully raised and fully lowered positions. In this way, the user can hold the up or down button 422 or on the remote 420 in order to raise or lower cover 110 to any desired height. When a desired height is reached, the user simply releases the button 422. When the up/down control signal is stopped, control proceeds to step 2522; otherwise, if the user is still holding down the control button 422, control returns to step 2514 to make sure the two actuators 120a, 120b are still in sync with each other.

At step 2522, the controller 402 stops the actuators 120 and/or the linear actuators 120 themselves stop moving.

In this embodiment, each linear actuator 120 has a built-in limit switch that cuts off power to the actuator 120 whenever an end limit is hit. In this way, regardless of whether the controller 402 continues to send the up or down command, the electric actuator 120 will shut off when the fully extended and fully retracted states are reached such as when step 2522 is reached from step 2518. In preferred embodiments, no power is utilized by the linear actuators 120 when the internal limit switch is reached until an opposite direction command is received. In other words, once the fully retracted limit is reached on a particular actuator 120, it will utilize no more power until an up command is received in order to start the particular actuator 120 being extended. Likewise, once the fully extended limit is reached on a particular actuator 120, it will utilize no more power until a down command is received in order to start the particular actuator 120 being retracted.

Furthermore, if the user stops pressing the up or down buttons on the remote 420, step 2522 will be reached from step 2520. In this case, the controller 402 stops generating the up or down control signal at step 2520. In this way, the linear actuators 120 can be stopped by the controller 042 at an intermediate position between their fully extended/fully retracted positions.

Once the actuators 120a, 120b are stopped, control returns to step 2502 to check whether a new up or down signal is received according to user input.

According to an exemplary embodiment, a tonneau cover system 100, 200, 300 for a vehicle 108 includes a cover 110, a scissor lift assembly 102, and an electric actuator 120. The scissor lift assembly 102 has a fixed arm 126 for mounting to an inner side panel 104 of a cargo bed 106 of the vehicle 108 and a plurality of movable arms 127 coupled to the fixed arm 126 for selectively raising and lowering the cover 110 in dependence upon a distance between a drive point 132 on one of the movable arms and the fixed arm 126. The electric actuator 120 has an end anchored at a fixed position 130 relative to the fixed arm 126 and a second end coupled to the drive point 132. The actuator 120 dynamically changes length under electrical power to be between an extended length and a retracted length thereby changing the distance between the drive point 132 and the fixed arm 126. A controller 402 controls the electric actuator 120 to change length in accordance with a user input signal.

An exemplary advantage of some embodiments is that the compact mechanical system of the two side scissor lift assemblies 102 consumes very little space in the cargo bed 106 thereby allowing most of the cargo area to be utilized for storage.

An exemplary advantage of some embodiments is that the cover 110 may be left in the open position (i.e., raised up to the fully raised position) for large cargo stored in the cargo area while the vehicle 108 is moving. For example, if a fridge or other large item needs to be transported, the cover can be raised, the fridge secured on the cargo bed 106 floor and then the vehicle 108 can be driven with the cover 110 remaining in the raised position. The sloped angle of the cover 110 raising from front to back ensures that wind forces resulting from the vehicle being driven in the forward direction tend to push down on the cover 110, which at worse will push the scissor assemblies 102 toward the closed position. Likewise, because the scissors assemblies 102 lift and slightly tilt the cover 110 such that is slope downward at the front, the system 100, 200, 300 allows greater clearance at the tailgate area and ensures rain and snow is guided away from the user standing behind the tailgate when the cover 110 is being raised.

However, other embodiments are also possible where the scissor assembly 102 on each side can be modified to lift the cover 110 in a level manner such that the cover 110 is always parallel to the cargo bed 106 floor if desired. Likewise, it is also possible to have any desired angle including angles where the slope raises from back to front if such an angle is desired for particular applications.

An exemplary advantage of some embodiments is that, when in any of the open positions right to fully opened, the scissor lift assembly 102 is stable as all arms 126, 127 are interconnected by at least two pivot points 128.

Although the invention has been described in connection with preferred embodiments, it should be understood that various modifications, additions and alterations may be made to the invention by one skilled in the art without departing from the spirit and scope of the invention. For example, although the above disclosure has illustrated a powered scissor lift assembly 102 on each of the right and left sides, in some embodiments, only one of the sides has a powered lift assembly 102. For example, only the right side (or left side) lift assembly may include an electric linear actuator 120 in some embodiments. In some embodiments, the system is powered via one electric actuators 120 on a first side that also powers the scissor lift 102 on the other side via a shaft and chain system.

In yet some embodiments, manual actuators may be provided rather than or in addition to electric powered actuators 120. Examples of manual actuators include gas cylinder springs, compression springs and extension springs. A locking mechanism to fix the position of a pivot point 128 or fold down legs on the corners of the cover allow the user to lock the cover 110 in the raised position. Allowing manually raising and lowering the cover 110 may be beneficial in situations where the battery 418 dies or one or more linear actuators 120 malfunctions. In some embodiments, a quick release or other tab attachment is provided where the linear actuator 120 attaches to the drive point 132 thereby allowing the actuator 120 to be disconnected from the drive point 132. In this way, in the event of a dead battery 418 or malfunctioning actuator 120, the cover 110 can still be raised or lowered by disengaging the electric actuator 120 from the drive point 132. Beneficially this requires the tailgate to be lowered to access the drive point 132 via the cargo bed 106 so security is maintained.

In some embodiments, the scissor lifting assembly 102 includes essentially two scissor sections connected via five arms. For instance, with reference to FIG. 8, the back upper arm 816 and the back lower arm 814 make up one scissor, the front upper arm 812 and the front lower arm 810 make up another scissor, and the other five pieces 126, 802, 804, 806, 808 are connecting arms. However, in other embodiments, the scissor lifting assembly 102 is built of any desired number of scissor sections interconnected by a plurality of arms. To raise the cover 110 a higher amount in the vertical direction above the cargo bed 106, more scissor sections can be added. Likewise, to reduce the amount the cover 110 is raised, fewer scissor sections can be added. Although the above examples have focused on particular examples of a structure of the scissor section that is stable and flexible for different applications, in other embodiments, different structures of scissor lift assemblies are utilized in a similar manner.

Although the above examples have shown the cover 110 covering the entire cargo bed 106 area, in some embodiments, the cover 110 may not cover the entire cargo bed 106. For example, the cover 110 may not extend forward to cover a toolbox 204 mounted at a front end of the cargo bed 106. In this way, a user may still access the toolbox even with the cover 110 is in the lowered (fully closed) position.

Although the above embodiments have illustrated the scissor lift assemblies 102 having a top arm 806 for mounting to the cover and a fixed bar 126 for mounting to an inner sidewall 104 of the cargo area 106, in some embodiments, the top bar 806 and/or the fixed bar 126 may be formed by the integral structures of the cover 110 and/or cargo side wall 104 themselves. For instance, the top bar 806 is a rigid section of the cover 110 in some embodiments. Likewise, the fixed arm 126 is a rigid section of the inner cargo area sidewall 104 in some embodiments.

Although, the cargo bed 106 is illustrated in a pickup truck herein, other types of vehicles 108 including cars with cargo areas, boats and other watercraft, other types of trucks, etc. may all benefit from an automated tonneau cover system 100, 200, 300 as disclosed herein.

A kit of parts to install an automated tonneau cover system 100, 200, 300 as disclosed herein may be sold to all a user to install the automated tonneau cover on an OEM vehicle such as a standard pickup truck. The kit may include the various fixed 126 and moveable arms 127 along with the electronics including the controller 402 and remote 420, for example.

Other types of structures may also be raised and lowered instead of or in addition to a cover 110. For instance, in some embodiments, the cover 110 is of solid construction with integrated alternate storage on the top side such as a bike rack and/or luggage rack or other types of roof rack systems. The scissor lifts 102 and actuators 120 disclosed herein may be sized with appropriate power and strength to lift both the cover 110 and one or more items that are stored on the cover 110 such as one or more bikes or luggage.

A spring can be added to the scissor lift assembly 102 to increase lifting capacity. The cover 110 may be removable with snaps or ties on each of the top bars. The height of elevation that scissor lifts 102 raise and lower the cover 110 may be adjusted in other embodiments to be any desired height. The arms 126, 127 may be made of any suitable materials. Examples of materials that may be utilized in different embodiments include stainless steel, carbon fiber, aluminum, rigid plastics, wood, and any combinations thereof.

The controller module 412 may be implemented by software executed by one or more processors 404 operating pursuant to instructions stored on a tangible computer-readable medium such as a storage device to perform the above-described functions of any or all aspects of the controller 402. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors 404 may be included in a general-purpose or specific-purpose computer that becomes the controller 402 or any of the above-described modules as a result of executing the instructions.

In other embodiments, rather than being software modules executed by one or more processors 404, the modules 412 may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A tonneau cover system for a vehicle, the tonneau cover system comprising:
    a cover;
    a first scissor lift assembly having a first fixed arm for mounting to a first inner side panel of a cargo bed of the vehicle and having a plurality of first movable arms coupled to the first fixed arm for selectively raising and lowering the cover in dependence upon a distance between a first drive point on one of the first movable arms and the first fixed arm;
    a first electric actuator coupled to the first scissor lift, the first electric actuator having a first end anchored at a fixed position relative to the first fixed arm and a second end coupled to the first drive point, the first electric actuator for dynamically changing length under electrical power to be between an extended length and a retracted length thereby changing the distance between the first drive point and the first fixed arm; and
    a controller coupled to the first electric actuator and configured to control the first electric actuator to change length in accordance with a user input signal;
    wherein the plurality of first movable arms of the first scissor lift assembly comprises:
        a bottom arm;
        a middle arm;
        a top arm;
        a short connector arm;
        a front lower arm;
        a front upper arm;
        a back lower arm; and
        a back upper arm;
        wherein the bottom arm is pivotally attached to the front lower arm and the back lower arm;
        the middle arm is pivotally attached to the front upper arm and the back lower arm;

the top arm is pivotally attached to the front upper arm and the back upper arm;

the short connector arm is pivotally attached to the middle arm and the back upper arm;

the front lower arm is pivotally attached to the bottom arm, the first fixed arm, and the front upper arm;

the front upper arm is pivotally attached to the middle arm, the front lower arm, and the top arm;

the back lower arm is pivotally attached to the bottom arm, the first fixed arm, the back upper arm, and the middle arm; and the back upper arm is pivotally attached to the short connector arm, the back lower arm, and the top arm.

2. The tonneau cover system of claim 1, further comprising:

a second scissor lift assembly having a second fixed arm for mounting to a second inner side panel of the cargo bed of the vehicle and having a plurality of second movable arms coupled to the second fixed arm for selectively raising and lowering the cover in dependence upon a distance between a second drive point on one of the second movable arms and the second fixed arm; and a second electric actuator coupled to the second scissor lift, the second electric actuator having a first end anchored at a fixed position relative to the second fixed arm and a second end coupled to the second drive point, the second electric actuator for dynamically changing length under electrical power to be selectively between the extended length and the retracted length thereby changing the distance between the second drive point and the second fixed arm;

wherein the controller is further coupled to the second electric actuator for controlling the second electric actuator to change length in accordance with the user input signal.

3. The tonneau cover system of claim 2, further comprising:

one or more first sensors coupled to the first electric actuator and the controller; and one or more second sensors coupled to the second electric actuator and the controller;

wherein the one or more first sensors detect a first length representing a current length of the first actuator;

the one or more second sensors detect a second length representing a current length of the second actuator; and the controller is further configured to control the first electric actuator and the second electric actuator in a synchronized manner to ensure that the first length and the second length are within a predetermined threshold difference.

4. The tonneau cover system of claim 1, further comprising a battery for providing electrical power to the controller and the first electric actuator.

5. The tonneau cover system of claim 1, further comprising a power supply line for coupling to the controller and the first electric actuator to a battery of the vehicle.

6. The tonneau cover system of claim 1, further comprising:

a wireless receiver coupled to the controller; and a remote control having a wireless transmitter;

wherein the controller receives the user input signal via the wireless receiver.

7. The tonneau cover system of claim 1, further comprising:

one or more buttons coupled to the controller;

wherein the controller receives the user input signal via the one or more buttons.

8. The tonneau cover system of claim 1, wherein the plurality of first movable arms are configured such that:

the cover is lowered to be level with a first side railing of the first inner side panel of the cargo bed when the first electric actuator is retracted to the retracted length; and the cover is raised in a manner that is not level with the first side railing of the first inner side panel of the cargo bed when the first electric actuator is extended to the extended length.

9. The tonneau cover system of claim 8, wherein, when the first electric actuator is extended to the extended length, the first scissor lift raises the cover such that a front edge of the cover is lower than a rear edge of the cover.

10. The tonneau cover system of claim 1, wherein:

the first end of the first electric actuator is anchored at the fixed position adjacent a pivot point between the first fixed arm and the back lower arm; and the second end of the first electric actuator is coupled to the first drive point being a pivot point between the bottom arm and the front lower arm.

11. The tonneau cover system of claim 1, wherein the cover is detachable from the first scissor lift assembly.

12. The tonneau cover system of claim 1, wherein at least a portion of the cover is foldable upwards such that a portion of the cargo bed can be accessed even when the first scissor lift assembly has fully lowered the cover.

13. The tonneau cover system of claim 1, wherein the cover is formed by a first section and a second section that are detachable from one another such that first scissor lift assembly only raises and lowers the first section of the cover when the first section and the second section are detached from one another.

14. The tonneau cover system of claim 1, wherein the vehicle is a pickup truck.

15. A tonneau cover scissor lift assembly for raising and lowering a cover above a cargo bed of a vehicle, the tonneau cover scissor lift assembly comprising:

a fixed arm for mounting to the cargo bed of a vehicle; and a plurality of movable arms coupled to the fixed arm;

wherein the plurality of movable arms comprises:

a bottom arm;

a middle arm;

a top arm;

a short connector arm;

a front lower arm;

a front upper arm;

a back lower arm; and a back upper arm;

wherein the bottom arm is pivotally attached to the front lower arm and the back lower arm;

the middle arm is pivotally attached to the front upper arm and the back lower arm;

the top arm is pivotally attached to the front upper arm and the back upper arm;

the short connector arm is pivotally attached to the middle arm and the back upper arm;

the front lower arm is pivotally attached to the bottom arm, the fixed arm, and the front upper arm;

the front upper arm is pivotally attached to the middle arm, the front lower arm, and the top arm;

the back lower arm is pivotally attached to the bottom arm, the fixed arm, the back upper arm, and the middle arm; and the back upper arm is pivotally attached to the short connector arm, the back lower arm, and the top arm.

16. The tonneau cover scissor lift assembly of claim 15, wherein:

the tonneau cover scissor lift assembly selectively raises and lowers the cover in dependence upon a distance between a first drive point and a fixed position relative to the fixed arm;

a first end of an electric actuator is anchored at the fixed position adjacent a pivot point between the fixed arm and the back lower arm; and a second end of the electric actuator is coupled to the first drive point being a pivot point between the bottom arm and the front lower arm.

17. The tonneau cover scissor lift assembly of claim 15, wherein the plurality of movable arms are configured such that:

the cover is lowered to be level with a side railing of the cargo bed in a retracted position; and the cover is raised in a manner that is not level with the side railing of the cargo bed when in an extended position.

18. The tonneau cover scissor lift assembly of claim 15, wherein, when the plurality of movable arms are moved into an extended position, the tonneau cover scissor lift assembly raises the cover such that a front edge of the cover is lower than a rear edge of the cover.

19. The tonneau cover scissor lift assembly of claim 15, being detachable from the cover.

20. The tonneau cover scissor lift assembly of claim 15, wherein the vehicle is a pickup truck.

\* \* \* \* \*